United States Patent
Caldwell et al.

(10) Patent No.: US 12,498,723 B2
(45) Date of Patent: *Dec. 16, 2025

(54) REMOTE VEHICLE GUIDANCE

(71) Applicant: Zoox, Inc., Foster City, CA (US)

(72) Inventors: Timothy Caldwell, Boulder, CO (US); Ravi Gogna, San Jose, CA (US); Meredith James Goldman, Redwood City, CA (US); Frank Reinaldo Ramirez, San Francisco, CA (US); Matthew Miller Young, San Francisco, CA (US); Rick Zhang, San Mateo, CA (US)

(73) Assignee: Zoox, Inc., Foster City, CA (US)

( * ) Notice: Subject to any disclaimer, the term of this patent is extended or adjusted under 35 U.S.C. 154(b) by 214 days.

This patent is subject to a terminal disclaimer.

(21) Appl. No.: 18/447,516

(22) Filed: Aug. 10, 2023

(65) Prior Publication Data

US 2024/0012419 A1    Jan. 11, 2024

Related U.S. Application Data

(63) Continuation of application No. 16/457,646, filed on Jun. 28, 2019, now Pat. No. 11,768,493.

(51) Int. Cl.
*G05D 1/00* (2024.01)
*G06F 3/0482* (2013.01)
(Continued)

(52) U.S. Cl.
CPC ......... *G05D 1/0212* (2013.01); *G05D 1/0088* (2013.01); *G06F 9/451* (2018.02); *G06F 3/0482* (2013.01); *G06F 3/04845* (2013.01)

(58) Field of Classification Search
CPC .... G05D 1/0212; G05D 1/0027; G06F 9/451; G06F 3/0482; G06F 3/04845
(Continued)

(56) References Cited

U.S. PATENT DOCUMENTS 8,996,224 B1    3/2015   Herbach et al.
9,008,890 B1 *  4/2015   Herbach .............. G05D 1/0297
                                                    340/436
(Continued)

FOREIGN PATENT DOCUMENTS

EP    3421316      1/2019
JP    H11149315 A  6/1999
(Continued)

OTHER PUBLICATIONS

Office Action for Japanese Application No. 2021-577397, Dated May 28, 2024, 9 pages.
(Continued)

*Primary Examiner* — Krishnan Ramesh
(74) *Attorney, Agent, or Firm* — Lee & Hayes, P.C.

(57) ABSTRACT

A vehicle computing system may identify an obstruction along a route of travel and may connect to a service computing device for guidance. The service computing device may include a guidance system configured to receive waypoint and/or orientation input from an operator. The operator may evaluate the scenario and determine one or more waypoints and/or associated orientations for the vehicle to navigate the scenario. In some examples, the guidance system may validate the waypoint(s) and/or associated orientation(s). The service computing device may send the waypoint(s) and/or associated orientation(s) to the vehicle computing system. The vehicle computing system may validate the waypoint(s) and/or associated orientation(s) and, based on the validation, control the vehicle according to the input. Based on a determination that the vehicle has navigated the scenario, the guidance system may release vehicle guidance back to the vehicle computing system.

20 Claims, 8 Drawing Sheets

(51) Int. Cl.
*G06F 3/04845* (2022.01)
*G06F 9/451* (2018.01)

(58) Field of Classification Search
USPC .......................................................... 701/27
See application file for complete search history.

(56) References Cited

U.S. PATENT DOCUMENTS

| | | | |
|---|---|---|---|
| 9,283,674 B2* | 3/2016 | Hoffman | B25J 9/1689 |
| 10,168,674 B1* | 1/2019 | Buerger | G05D 1/0088 |
| 10,268,191 B1 | 4/2019 | Lockwood et al. | |
| 2009/0037033 A1* | 2/2009 | Phillips | G05D 1/0088 701/2 |
| 2012/0095619 A1 | 4/2012 | Pack et al. | |
| 2013/0158772 A1 | 6/2013 | Swenson et al. | |
| 2013/0338856 A1* | 12/2013 | Yelland | B64C 13/20 701/2 |
| 2014/0288759 A1 | 9/2014 | Cima | |
| 2015/0248131 A1 | 9/2015 | Fairfield et al. | |
| 2017/0192423 A1 | 7/2017 | Rust et al. | |
| 2017/0255195 A1 | 9/2017 | Mabuchi | |
| 2017/0370742 A1* | 12/2017 | Schumann | H04L 67/5681 |
| 2018/0194344 A1 | 7/2018 | Wang et al. | |
| 2018/0257643 A1 | 9/2018 | Kroop et al. | |
| 2018/0275647 A1 | 9/2018 | Li et al. | |
| 2018/0300834 A1 | 10/2018 | High et al. | |
| 2018/0339703 A1 | 11/2018 | Nix | |
| 2019/0004524 A1 | 1/2019 | Wang et al. | |
| 2019/0016384 A1 | 1/2019 | Carlson et al. | |
| 2019/0019349 A1 | 1/2019 | Dolgov et al. | |
| 2019/0034794 A1* | 1/2019 | Ogale | G05D 1/0212 |
| 2019/0138013 A1* | 5/2019 | Wu | G05D 1/46 |
| 2019/0196478 A1* | 6/2019 | Mocherla | G05D 1/0088 |
| 2019/0321977 A1 | 10/2019 | Tan et al. | |
| 2020/0004240 A1 | 1/2020 | Biehler et al. | |
| 2020/0089222 A1 | 3/2020 | Camara et al. | |
| 2020/0143686 A1 | 5/2020 | Conroy et al. | |
| 2020/0225044 A1 | 7/2020 | Tohriyama et al. | |
| 2020/0409352 A1 | 12/2020 | Caldwell et al. | |
| 2020/0409368 A1 | 12/2020 | Caldwell et al. | |
| 2021/0116907 A1 | 4/2021 | Altman | |
| 2021/0295714 A1 | 9/2021 | Huang | |
| 2022/0019213 A1 | 1/2022 | Haghighat Kashani et al. | |

FOREIGN PATENT DOCUMENTS

| | | |
|---|---|---|
| JP | 2007310698 A | 11/2007 |
| JP | 2010152833 A | 7/2010 |
| JP | 2014016858 A | 1/2014 |
| JP | 2016095851 A | 5/2016 |
| JP | 2018077649 A | 5/2018 |
| JP | 2018538647 A | 12/2018 |
| JP | WO2019077739 A1 | 4/2019 |
| WO | WO2019024963 A1 | 2/2019 |

OTHER PUBLICATIONS

Office Action for U.S. Appl. No. 16/457,646, mailed on Sep. 16, 2022, Caldwell, "Remote Vehicle Guidance" 27 pages.
Office Action for U.S. Appl. No. 16/457,646, mailed on Jan. 23, 2023, Caldwell, "Remote Vehicle Guidance", 32 Pages.
Office Action for U.S. Appl. No. 16/457,654, mailed on Dec. 21, 2021, Caldwell, "Vehicle Control and Guidance", 56 Pages.
Office Action for U.S. Appl. No. 16/457,646, mailed Feb. 22, 2022, Caldwell, "Remote Vehicle Guidance", 22 pages.
Office Action for U.S. Appl. No. 16/457,654, mailed Apr. 19, 2022, Caldwell, "Vehicle Control and Guidance", 57 pages.
Office Action for U.S. Appl. No. 16/457,646, mailed on Jun. 7, 2022, Caldwell, "Remote Vehicle Guidance", 24 Pages.
Office Action for U.S. Appl. No. 16/457,654, mailed on Jul. 26, 2021, Caldwell, "Vehicle Control and Guidance", 44 pages.
International Preliminary Report on Patentability for PCT Application No. PCT/US20/39575, mailed Jan. 6, 2022, 8 pgs.
PCT Search Report and Written Opinion mialed on Sep. 22, 2020 for PCT Application No. PCT/US2020/039575, 13 pages.
PCT Search Report and Written Opinion mailed on Sep. 28, 2020 for PCT Application No. PCT/US2020/039594, 15 pages.
Examination Report for European Application No. 23184319.4, Dated Feb. 13, 2025, 3 pages.
Office Action for Japanese Application No. 2021-577397, Dated Mar. 11, 2025, 6 pages.
Extended European Search Report mailed Nov. 8, 2023 for European Application No. 23184319.4, a foreign counterpart to U.S. Pat. No. 11,768,493, 8 pages.
Office Action for Japanese Application No. 2021-577397, Dated Sep. 24, 2024, 4 pages.
Office Action for Japanese Application No. 2021-577395, Dated Jun. 4, 2024, 19 pages.
Office Action for European Application No. 23184319.4, Dated Jul. 9, 2024, 4 pages.

* cited by examiner

REMOTE VEHICLE GUIDANCE

RELATED APPLICATIONS

This application claims priority to and is a continuation of U.S. patent application Ser. No. 16/457,646, filed on Jun. 28, 2019, the entire contents of which are incorporated herein by reference.

BACKGROUND

Vehicles operate in dynamic environments in which conditions are often changing. Among the changing conditions are road blockages due to construction, accidents, and the like. Autonomous vehicles may be programmed to react to the changing conditions, while maintaining the vehicle within a designated operations protocol. The operations protocol may include defined rules of operation, such as not operating the vehicle into a lane designated for opposite direction traffic. However, oftentimes a detour around an accident, construction zone, or the like may indicate a route outside the parameters of the operations protocol. Unauthorized to operate outside the bounds of the operations protocol, the autonomous vehicle may be unable to proceed around the obstacle and may thus be stuck in place.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
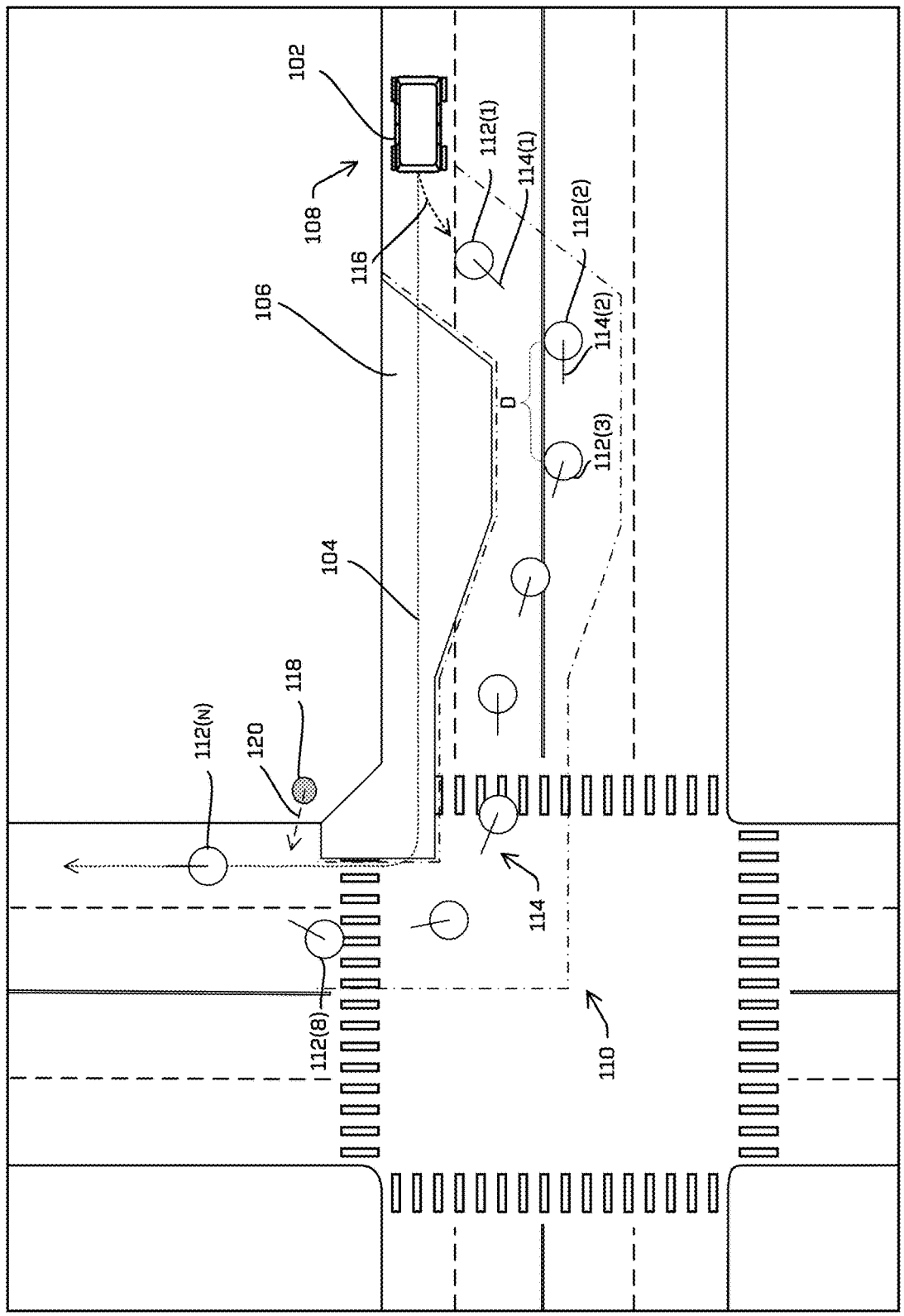
FIG. 1 is an illustration of an autonomous vehicle in an environment, in which a remote vehicle guidance system may be used to assist in guiding the vehicle through an environment.

This disclosure is directed to techniques for remotely providing incremental guidance to a vehicle operating in an environment that has encountered a scenario that is difficult to navigate (e.g., in which a planner is unable to plan a route according to a set of driving policies, or otherwise). The vehicle may include an autonomous or semi-autonomous vehicle with a vehicle computing system configured to request guidance from a remote vehicle guidance system based on an obstacle encountered in an operating environment. The remote vehicle guidance system may include a graphical user interface (GUI) through which an operator may input suggested waypoints and/or orientations (e.g., vehicle yaw at a corresponding waypoint) for the vehicle to navigate through the scenario (e.g., around one or more obstacles). The vehicle may receive the suggested waypoints and/or orientations and verify that navigating along the path defined by the suggested waypoints and/or orientations satisfies a safety protocol of the vehicle. Accordingly, the techniques described herein improve the safety of the vehicle operating in the environment.

The vehicle computing system may receive sensor data from one or more sensors (e.g., cameras, motion detectors, lidar, radar, time of flight, etc.) of the vehicle. The vehicle computing system may determine, based on the sensor data, that the vehicle is approaching an obstacle on the route around which the vehicle may not be configured to determine a viable path (e.g., road blockage, construction zone in the road, driveline beyond vehicle line-of-sight (e.g., sensor vision impaired due to elevation of road and/or turns in a road), trajectory around the obstacle would violate a control policy, etc.), referred to herein as a remote guidance scenario. The remote guidance scenario may include a scenario in which the vehicle computing system is not programmed to perform (e.g., unknown scenario) and/or a scenario that appears to violate an operations protocol (e.g., a trajectory required to navigate the scenario would violate the operations protocol (e.g., control policy)). The operations protocol may include one or more rules governing actions the vehicle may or may not take such as not crossing a double yellow line, not driving into oncoming traffic lanes, not exceeding the bounds of a drivable surface of a road, or the like. For example, the vehicle computing system may detect that a road on which the vehicle is traveling is blocked and that a way around the blockage would include driving into lanes designated for traffic traveling in an opposite direction, violating an operations protocol.

In some examples, responsive to detecting the remote guidance scenario, the vehicle computing system may automatically connect to a service computing device configured with the GUI. In various examples, a vehicle operator and/or safety observer may detect the remote guidance scenario and may connect to the service computing device. In some examples, the vehicle computing system may send a request for guidance to the service computing device. In various examples, prior to receiving a response (e.g., guidance input) from the service computing device, the vehicle computing system may determine a solution for navigating the remote guidance scenario. In such examples, the vehicle computing system may control the vehicle according to the solution. In some examples, the vehicle computing system may send a second message to the service computing device indicating that guidance input is no longer needed (e.g., indicating that the vehicle is proceeding without remote guidance). In some examples, the vehicle computing system may proceed to control the vehicle without sending the second message to the service computing device. In such examples, at least one of the vehicle computing system or the service computing device may determine that the guidance input is not necessary and may disconnect from the other computing device.

In some examples, responsive to receiving the request for guidance, the service computing device may determine that one or more conditions for providing guidance are met. The condition(s) may include a connection threshold (e.g., threshold latency, threshold bandwidth, etc.), a vehicle velocity below a threshold velocity (e.g., 15 miles per hour, 20 kilometers per hour, etc.), a threshold number/type of sensor operational (e.g., threshold of 4 cameras operational, all vehicle lidar sensor operational, etc.), a lack of vehicle health related faults (e.g., faults related to inconsistent sensor readings, one or more inoperative sensors, fault associated with a collision avoidance system, planner system, and/or other vehicle system, etc.), and/or other conditions that may impact the effectiveness of the remote guidance system. In some examples, responsive to a determination that a condition is not met, the service computing device may not connect with the vehicle computing system. In some examples, responsive to a determination that a condition is not met, the service computing device deny the operator access to the GUI and/or deny input into the GUI. In such examples, denying access may enhance safety of vehicle operation, such as, for example, not permitting remote guidance without sufficient latency to ensure that the vehicle computing system is able to respond in an adequate time frame to avoid unsafe outcomes. In some examples, responsive to a determination that the conditions are met, the service computing device may launch the GUI.

In some examples, the GUI may include one or more windows depicting sensor data from one or more sensors on the vehicle. In at least one example, the GUI may include windows depicting streaming images captured by a camera on the vehicle. The window(s) may depict data to assist the operator in determining a path for the vehicle to take. For example, the GUI may include four windows depicting a left front view, front view, right front view, and a rear view associated with a vehicle. The operator may assess each of the views to determine a safe path for the vehicle to transit though the remote guidance scenario.

In various examples, the GUI may include a depiction of a top view of the vehicle and the remote guidance scenario in the environment. In such examples, the top view may include a computer-generated view of the environment based on sensor data. In some examples, the top view may include a position of the vehicle with respect to one or more obstacles of the remote guidance scenario. For example, atop view may depict a vehicle approaching multiple orange cones blocking a pre-determined (e.g., planned) path of the vehicle. The top view may include the vehicle and the cones.

In various examples, the GUI may be configured to receive input from the operator via the top view. In such examples, the operator may be able to provide guidance to the vehicle to navigate through the remote guidance scenario, such as around obstacle(s) associated therewith. The input may include one or more waypoints. The waypoint(s) may include locations over which the vehicle will travel. In various examples, the waypoint(s) may each include stopping points. In such examples, the vehicle may be configured to stop at each of the waypoint(s), such as absent receipt or verification of a subsequent waypoint. In at least some examples, where a subsequent waypoint is provided, the vehicle may continue planning and moving between waypoints without stopping.

In various examples, the input may include an orientation (e.g., yaw) of the vehicle at an associated waypoint. In such examples, the operator may be able to cause the vehicle to face a particular direction at the associated waypoint. In some examples, the orientation may be determined based on a previous and/or subsequent waypoint. In such examples, the orientation at a particular waypoint may enable the vehicle to smoothly transition between waypoints on a guidance route. In various examples, an orientation associated with a waypoint may be based on a preferred orientation should the vehicle be stopped at the waypoint. For example, a preferred orientation associated with vehicles located at least partially in a lane associated with opposite direction traffic may be parallel to the lane such that an amount of the vehicle located in the lane may be minimized.

In some examples, the operator may cause the service computing device to send the waypoint(s) and/or orientation(s) to the vehicle computing system. In some examples, the service computing device may automatically send the waypoint and/or associated orientation responsive to input by the operator. In such examples, based on a determination that the waypoint is confirmed in a particular place, and/or the orientation is confirmed, the service computing device may automatically send the waypoint and/or orientation. In some examples, the waypoint and/or associated orientation may be sent responsive to receiving a send command (e.g., selection of a send option) from the operator. In such examples, the operator may be able to send waypoints individually and/or in groups.

In some examples, the service computing device may be configured to validate the waypoint(s) and/or orientation(s) prior to sending the guidance data to the vehicle computing system. In some examples, the validation may include an initial verification that the waypoint(s) and/or orientation(s) pass a safety protocol associated with the vehicle. The safety protocol may include a pre-determined set of conditions for ensuring vehicle safety. The safety protocol may include one or more threshold distances for the vehicle to maintain away from dynamic and/or static objects, maximum yaw rates and/or other criteria associated with safe navigation of the vehicle through the remote guidance scenario. In various examples, the vehicle computing system may receive the waypoint(s) and/or orientation(s) from the service computing device and may validate the waypoint(s) and/or orientation(s). In such examples, the vehicle computing system may verify that the waypoint(s) and/or orientation(s) pass the safety protocol and may safely be performed by the vehicle.

In some examples, the vehicle computing system may be configured to verify that the waypoint(s) and/or orientation(s) based at least in part on a remote guidance protocol. In such examples, the vehicle computing system may validate the waypoint(s) and/or orientation(s) based in part on a determination that the waypoint(s) and/or orientation(s) pass the remote guidance protocol. The remote guidance protocol may include one or more limitations on vehicle movement while operating in the remote guidance mode. The remote guidance protocol may include a path deviation (e.g., distance from a path between two waypoints the vehicle may deviate, such as to circumvent obstacles, ½ width of the vehicle, 1 vehicle width, etc.), response to static object detection (e.g., attempt to circumvent static objects to get to a follow-on waypoint, response to dynamic object detection (e.g., yield to agents predicted to enter a path corresponding to the waypoints), follow dynamic objects moving in the same direction as the vehicle (e.g., in the path corresponding to the waypoints), yield as appropriate for right of way at intersections (e.g., four way stops, traffic lights, roundabouts, etc.), stop forward motion if no further guidance received (e.g., another waypoint, instruction to resume navigation, etc.), or the like.

Additionally or in the alternative, the vehicle computing system may be configured to validate the waypoint(s) and/or orientation(s) based at least in part on a kinematics validation (e.g., dynamics validation, kinematics/dynamics checks). The kinematics validation may include determining that the vehicle is capable of performing a transition from a first position (e.g., an initial position, position associated with a waypoint, etc.) to a second position (e.g., first waypoint, subsequent waypoint, etc.). In some examples, the capability of performing the transition may include determining whether the vehicle computing system can generate one or more trajectories for the vehicle to perform to arrive at the waypoint(s) in the orientation(s) based on physical constraints. The physical constraints may include a maximum yaw rate, maximum lateral distance, maximum turn angle, and/or other constraints associated with vehicle maneuvering.

Responsive to a determination that a waypoint and/or associated orientation violates the safety protocol and/or the remote guidance protocol, the vehicle computing system may reject the waypoint. In some examples, the vehicle computing system may not proceed to the rejected waypoint, such as by not proceeding from a stopping point (e.g., a stop line, stop sign, traffic light, etc.) or stopping at a waypoint prior to the rejected waypoint. In some examples, the vehicle computing system may send a message to the service computing device indicating the rejection of the waypoint. In some examples, the message may include a reason for the rejection. For example, the vehicle computing system may determine that a waypoint is less than a threshold distance from a cement barrier. Based on the determination, the vehicle computing system may reject the waypoint and send a message to the service computing device indicating that the distance is less than the threshold distance.

Responsive to a determination that the waypoint(s) and/or associated orientation(s) pass the safety protocol and/or the remote guidance protocol, the vehicle computing system may accept the waypoint(s) and/or orientation(s). The vehicle computing system may process the waypoint(s) and/or orientation(s) and generate one or more trajectories for the vehicle to transit between waypoints. For example, the vehicle computing system may receive a first waypoint and a first orientation associated with the first waypoint. The vehicle computing system may determine a first trajectory (or set of trajectories) to transit from an initial position to the first waypoint at the first orientation.

Based on the generated trajectories, the vehicle computing system may control the vehicle to the waypoint(s) at the associated orientation(s), such as via one or more drive systems. In various examples, the vehicle computing system may control the vehicle at a pre-determined velocity (e.g., 20 kilometers per hour, 15 miles per hour, 10 miles per hour, etc.). In some examples, the pre-determined velocity may include a maximum velocity associated with remote guidance. In various examples, the vehicle computing system may control the vehicle at a velocity associated with the environment and/or the scenario. In at least one example, the vehicle computing system may control the vehicle at the lesser of the pre-determined velocity or the velocity associated with the environment and/or the scenario. For example, a vehicle computing system, when operating in a remote guidance mode, may operate at a pre-determined maximum velocity of 15 miles per hour. The vehicle computing system may detect a remote guidance scenario and request guidance input from a service computing device. The vehicle computing system, and/or the operator may determine, based on sensor data, that the remote guidance scenario has associated therewith a speed limit of 5 miles per hour. Based on the speed limit of 5 miles per hour being less than the pre-determined maximum velocity of 15 miles per hour, the vehicle computing system may limit the velocity of the vehicle to 5 miles per hour while navigating through the remote guidance scenario.

In various examples, the vehicle computing system may be configured to continuously and/or periodically verify that the vehicle will not violate the safety protocol and/or remote guidance protocol while navigating through the remote guidance scenario (e.g., traveling waypoint to waypoint). For example, a vehicle computing system may control a vehicle from a first waypoint to a second waypoint. The vehicle computing system may detect a pedestrian with a trajectory that appears to intersect with a trajectory associated with the vehicle. The vehicle computing system may determine an action to take based on the pedestrian, such as yielding to the pedestrian.

In various examples, the service computing device may determine that a scenario is complete (e.g., vehicle passes obstacle, can resume normal operations) and may release the vehicle from the remote guidance. In some examples, scenario completion may be based in part on a generated waypoint being within a threshold distance (e.g., 0.5 meters, 0.5 feet, 10 inches, etc.) of an original route associated with the vehicle. In some examples, scenario completion may be based on sensor data input. In such examples, the operator may view the sensor data via the GUI to determine that the scenario is complete. For example, the obstacle may include a construction zone. A camera feed from the vehicle may depict an end of the construction zone behind the aircraft. Based on a determination that the construction zone is behind the vehicle, the operator may determine that the scenario is complete. In some examples, determination may be based on a planner system determining a trajectory which is allowable (e.g., doesn't violate a control policy) and/or can continue along a determined path.

In various examples, responsive to a determination that the scenario is complete, the service computing device may send a release signal to the vehicle. In such examples, responsive to the release signal, the vehicle computing system may be configured to resume navigation of the vehicle (e.g., autonomous control). In various examples, the service computing device may determine that the scenario blocked an initial route of the vehicle. In such examples, the service computing device may be configured to generate an updated route for the vehicle to arrive at a pre-determined destination. In some examples, the service computing device may send the updated route to the vehicle computing system prior to sending the release signal. In some examples, the service computing device may send the updated route substantially concurrently with the release signal (e.g., within 1 second, 2 seconds, etc.). Responsive to receipt of the updated route, the vehicle computing system may control the vehicle along the updated route to the pre-determined destination. In some examples, the vehicle computing system may determine that the scenario blocked the initial route. In such examples, the vehicle computing system may be configured to generate the updated route to navigate to the destination.

The techniques discussed herein may improve a functioning of a vehicle computing system. Traditionally, in control planning for an autonomous vehicle, a vehicle computing system may continually process sensor data to determine a viable route for the vehicle until it determines a solution. In examples in which the vehicle encounters a remote guidance scenario, the solution may be unattainable based on constraints put on the vehicle computing system, such as in operations protocols. In such examples, the vehicle computing system may utilize a tremendous amount of computing resources without reaching a solution. Thus, the vehicle may be stuck in a particular position on a planned route while the vehicle computing system continues to use processing power and/or memory to identify a path through the remote guidance scenario.

The techniques described herein provide a technical solution to the technical problem encountered by the vehicle computing system due to the constraints by utilizing remote computing resources to identify a near-real time solution for navigating through the remote guidance scenario. The graphical user interface on the service computing device, as described herein may process sensor data from the vehicle computing system and provide guidance to the vehicle computing system, thereby reducing the amount of processing power and/or memory used by the vehicle computing system, which in some examples, could otherwise be stuck in an infinite loop of processing without identifying a solution.

Additionally, the techniques described herein may increase the safety of operation of the autonomous vehicle through an environment. For example, the vehicle computing system may connect to the service computing device for guidance input based on a determination that further movement may violate an operations protocol. To ensure a maximum degree of safety, the vehicle computing system may request guidance from a remote operator that may be configured to evaluate a situation and determine a safe route forward. Further, the vehicle computing system may receive the input and may verify that the guidance input results in a safe operation of the vehicle prior to controlling the vehicle according to the input.

The techniques described herein may be implemented in a number of ways. Example implementations are provided below with reference to the following figures. Although discussed in the context of an autonomous vehicle, the methods, apparatuses, and systems described herein may be applied to a variety of systems (e.g., a sensor system or a robotic platform), and are not limited to autonomous vehicles. In another example, the techniques may be utilized in an aviation or nautical context, or in any system using machine vision (e.g., in a system using image data).

FIG. 1 is an illustration of an autonomous vehicle 102 (vehicle 102) in an environment 100, in which a remote guidance system may determine a deviation from a planned route 104 (e.g., initial route, planned path, etc.) based on a detection of a remote guidance scenario 106 (e.g., an obstruction on the planned route 104 around which the vehicle may not be configured to determine a viable path). The remote guidance scenario 106 may include a scenario in which a vehicle computing system is not programmed to perform and/or a scenario that appears to violate an operations protocol (e.g., a trajectory required to navigate the scenario would violate the operations protocol (e.g., control policy)). The operations protocol may include one or more rules governing actions the vehicle may or may not take such as not crossing a double yellow line, not driving into oncoming traffic lanes, not exceeding the bounds of a drivable surface of a road, or the like. In some examples, the remote guidance scenario 106 may include a scenario in which an obstacle extends beyond a perception distance associated with the vehicle 102. For example, as illustrated in FIG. 1, the vehicle 102 may be unable to perceive the entirety of the remote guidance scenario 106 from an initial position 108 (e.g., initial location and/or orientation). Additionally illustrated in FIG. 1, the remote guidance scenario 106 may include one or more obstacles blocking the planned route 104 of the vehicle 102, such that navigating around the remote guidance scenario 106 would result in the vehicle 102 operating in a lane designated for opposite direction traffic. As non-limiting examples, the remote guidance scenario 106 may comprise cones, barricades, etc. which demarcate an altered lane boundary, workers signaling a direction for the vehicle 102 to proceed, or otherwise a scenario which differs from a set of nominal driving scenarios.

In various examples, the vehicle computing system may detect the remote guidance scenario 106 based on sensor data from one or more sensors. The sensor(s) may include cameras, motion detectors, lidar, radar, time of flight, and/or other sensors mounted on the vehicle 102. As will be discussed in greater detail below with respect to FIG. 8, a planner component of the vehicle computing system may be configured to navigate the vehicle 102 along the planned route 104. The planner component may receive processed sensor data from a perception component of the vehicle computing system and may determine one or more trajectories for the vehicle to travel along the planned route 104 based on the sensor data. The trajectories may include a direction, orientation, and/or speed the vehicle may travel through the environment.

The trajectories associated with the vehicle operation may be determined based in part on an operations protocol (e.g., one or more operating constraints) placed on the vehicle computing system. The operations protocol may include one or more rules governing actions the vehicle may or may not take such as not crossing a double yellow line, not driving into oncoming traffic lanes, not exceeding the bounds of a drivable surface of a road, not exceeding a speed limit, or the like. For example, an operations protocol may include a limitation for the vehicle to remain on a paved surface of a road. The vehicle computing system may thus be configured to generate one or more trajectories that maintain the vehicle 102 on the paved surface of the road.

In various examples, the vehicle computing system may receive the sensor data and determine that planned route 104 is blocked, such as by an obstacle, or otherwise has a high uncertainty for proceeding, cannot proceed without violating a control policy, or the like. In some examples, the vehicle computing system may process the sensor data and attempt to generate one or more trajectories (that satisfy operations protocol) for the vehicle to navigate around the obstacle. However, in some examples, the scenario encountered, such as the remote guidance scenario 106 depicted in FIG. 1, may not include a possible trajectory (or path) that satisfies the operations protocol. In such examples, the vehicle computing system may identify the scenario as the remote guidance scenario 106 and may cause the vehicle to come to a stop at initial position 108. In various examples, based on a detection (e.g., identification) of the remote guidance scenario 106, the vehicle computing system may cause one or more hazard signals (e.g., hazard lights, audio signal, etc.) to emit from the vehicle.

Based on detection of the remote guidance scenario 106, the vehicle computing system may automatically connect to the service computing device, such as via the one or more networks. The network(s) may include public networks such as the internet, private networks such as an institutional and/or personal network or some combination of public and private networks. The network(s) may also include any type of wired and/or wireless network, including but not limited to satellite networks, cable networks, Wi-Fi networks, WiMax networks, mobile communications networks (e.g., 3G, 4G, 5G, etc.), local area networks (LAN), wide area networks (WAN), or any combination thereof. In some examples, the vehicle computing system may connect to the service computing device based on input received from an input/output device, such as a by a press of a button. For example, a safety observer, vehicle operator, or passenger in the vehicle may press a button to connect to the service computing device, such as for remote guidance.

In various examples, the vehicle computing system may send signal indicating the remote guidance scenario 106. In some examples, the signal may include a request for guidance data (e.g., guidance input) from the service computing device. In some examples, responsive to connecting with and/or receiving a request for guidance data from the vehicle computing device, the service computing device may verify that conditions for guidance are met. The conditions for guidance may include system checks to ensure that the service computing device can effectively provide guidance to the vehicle 102. The conditions may include a vehicle velocity below a threshold (e.g., less than 15 miles per hour, less than 20 kilometers per hour, etc.), a threshold number and/or type of sensors are available (e.g., minimum of four cameras providing forward, aft, left, and right views operational, sensors associated with aerial perspective view operational, etc.), threshold bandwidth (e.g., equal to or greater than 10 megabytes per second, 15 megabytes per second, etc.), threshold latency (e.g., equal to or less than 300 milliseconds, 250 milliseconds, etc.), no vehicle health related faults (e.g., steering column fault, etc.), or the like.

In some examples, responsive to a determination that one or more conditions are not met, the service computing device may deny a connection (e.g., not connect) with the vehicle computing system. In various examples, responsive to a determination that one or more conditions are not met, the service computing device may deny an operator access to and/or deny input (e.g., disable input capability) into the graphical user interface (GUI) of the service computing device. In some examples, the service computing device may send the vehicle computing device an indication that the condition(s) are not met and/or that the remote guidance system is unavailable.

In various examples, responsive to a determination that the conditions are met, the service computing device may launch the GUI on a display. In various examples, the GUI may include one or more windows depicting sensor data from the sensor(s) of the vehicle 102. For example, the window(s) may each depict real-time or near real-time (e.g., such as based on latency) camera images captured by cameras mounted on the vehicle 102. In various examples, the data depicted in the window(s) may provide the operator with information to assist in determining a path around the remote guidance scenario 106.

In various examples, the GUI may include a depiction of a top-down view of the vehicle 102 (or otherwise configurable by the remote operator) and the remote guidance scenario 106 in the environment 100. In such examples, the top view may include a computer-generated view of the environment based on sensor data. In some examples, the top view may include a position of the vehicle 102, such as initial position 108, with respect to one or more obstacles of the remote guidance scenario 106. As will be discussed in further detail with regard to FIG. 2, the GUI may be configured to receive input from the operator via the top view. In such examples, the operator may be able to provide guidance to the vehicle to navigate through the remote guidance scenario 106, such as through a drive corridor 110. The drive corridor 110 may represent a drivable surface around the remote guidance scenario 106 in which the operator may input one or waypoints 112. The waypoint(s) 112 may include locations (e.g., X, Y, Z coordinates, etc.) over which the vehicle will travel. In various examples, the waypoint(s) 112, such as waypoint 112(1) through waypoint 112(N), may each include stopping points. In such examples, the vehicle may be configured to stop at each of the waypoint(s) 112, such as absent receipt or verification of a subsequent waypoint 112. For example, the operator may input waypoint 112(1) and absent receipt of waypoint 112(2), the vehicle computing device may cause the vehicle 102 to stop at waypoint 112(1) until further guidance is received.

In various examples, the input may include an orientation 114 (e.g., yaw) of the vehicle 102 at an associated waypoint 112. In such examples, the operator may be able to cause the vehicle to face a particular direction at the associated waypoint 112. In various examples, an orientation 114 associated with a waypoint 112 may be determined based on a preferred orientation should the vehicle be stopped at the waypoint. For example, to minimize exposure to oncoming traffic when navigating around a remote guidance scenario 106, a preferred orientation associated with a vehicle 102 located at least partially in a lane associated with opposite direction traffic may be substantially parallel (e.g., within 5 degrees, etc.) to the lane such that an amount of the vehicle 102 located in the lane may be minimized. Accordingly, at least to minimize exposure to opposite direction traffic, orientation 114(2) associated with waypoint 112(2) may be substantially parallel to the lane. In at least some examples, such orientations may be provided to enable the vehicle to find a trajectory which connects subsequent waypoints.

In some examples, the orientation 114 may be determined based on a previous and/or subsequent waypoint 114. In such examples, the orientation 114 at a particular waypoint 112 may enable the vehicle to smoothly transition between waypoints on a guidance route. For example, a first orientation 114(1) associated with a first waypoint 112(1) may represent a straight line or spline in the direction of a second waypoint 112(2). A second orientation 114(2) associated with the second waypoint 112(2) may represent a spline in the direction of the third waypoint 112(3), and so on. As will be discussed in greater detail below, the vehicle computing device may receive the waypoint 112 and/or the orientation 114 and may generate one or more trajectories to smoothly control the vehicle 102 between waypoints and/or orientations.

In various examples, the operator may place a waypoint 112, such as waypoint 112(1) at a position in the drive corridor 110. The drive corridor 110 may include a determined section of the road that the vehicle 102 may transit through to navigate the remote guidance scenario 106. In various examples, the service computing device may generate the drive corridor 110 based on sensor data received from the sensors on the vehicle. In some examples, the service computing device may generate the drive corridor 110 based on one or more detected obstacles in the environment 100. For example, a remote guidance scenario 106 may include obstacles on a right side and a left side of the vehicle 102. The drive corridor 110 and/or a width thereof may be defined by the distance between obstacles and/or a safety buffer (e.g., pre-determined distance to maintain the vehicle 102 away from the obstacles). In various examples, a width of the drive corridor 110 may be determined based on a width of the vehicle. In some examples, the width of the drive corridor 110 may additionally include a safety buffer on either side of the vehicle 102. In various examples, the drive corridor 110 may represent an area in which an operator may input waypoints 112. In such examples, the GUI may not permit waypoints 112 to be input outside of the drive corridor 110.

In various examples, the GUI may limit a distance D (e.g., 10 feet, 15 feet, 7 meters, etc.) between waypoints 112 and/or between an initial position 108 and a first waypoint 112(1). In some examples, the GUI may not permit waypoints 112 to be input more than the distance D away from one another. In some examples, the GUI may activate an area with a radius of D around the vehicle 102 in which the operator may input a waypoint 112. In some examples, the GUI may provide a notification to the operator, such as in a pop-up notification, that an input is outside the distance D and will not be accepted. In various examples, limiting the distance between waypoints may enable the incremental guidance of the vehicle 102 through the environment 100 and may ensure that the vehicle 102 may safely maneuver the remote guidance scenario 106.

In various examples, the operator may input a waypoint 112 and/or an associated orientation 114, such as waypoint 112(1) and orientation 114(1), into the GUI. As will be discussed in greater detail below with regard to FIG. 2, the operator may input the waypoint 112(1) by selecting a location in the environment 100 for the waypoint 112(1) and confirming the location. In some examples, confirmation of the location may include a click of the mouse at the location and/or a selection of a confirmation option on the GUI. In various examples, responsive to receiving confirmation of the waypoint 112 and/or orientation 114, the service computing device may validate the waypoint 112 and/or orientation 114. A validation of a waypoint 112 and/or orientation 114 may include a verification that the waypoint 112 and/or orientation 114 satisfies a safety protocol of the vehicle. The safety protocol may include one or more rules associated with the safe operation of the vehicle 102, such as a location of the waypoint 112 on a road (e.g., not less than ½ width of the vehicle 102 from the edge of the road or drivable surface), waypoints 112 within a threshold distance of an initial position 108 or within a threshold distance of one another, one or more threshold distances for the vehicle 102 to maintain away from dynamic and/or static objects, maximum yaw rates, and/or other criteria associated with safe navigation of the vehicle 102 through the environment 100.

In some examples, the operator may cause the service computing device to send the waypoint(s) 112 and/or orientation(s) 114 to the vehicle computing device. In some examples, the service computing device may automatically send the waypoint 112 and/or associated orientation 114 responsive to input by the operator. In such examples, based on a determination that the waypoint 112 is confirmed in a particular place, and/or the orientation 114 is confirmed, the service computing device may automatically send the waypoint 112 and/or orientation 114. In various examples, one or more waypoints 112 and/or associated orientations 114 may be sent based on a determination that the point are validated (e.g., pass a safety protocol, remote guidance protocol, and/or a kinematics validation). In some examples, the waypoint 112 and/or associated orientation 114 may be sent responsive to receiving a send command (e.g., selection of a send option), such as that input by the operator. In some examples, the GUI may be configured to send waypoints 112 and/or associated orientations 114 individually and/or in groups.

In various examples, the vehicle computing system may receive the waypoint(s) 112 and/or orientation(s) 114 from the service computing device and may validate the waypoint(s) 112 and/or orientation(s) 114. In such examples, the vehicle computing system may verify that the waypoint(s) 112 and/or orientation(s) 114 pass the safety protocol and may safely be performed by the vehicle 102 and/or a kinematics validation (e.g., that the vehicle 102 can achieve the desired waypoint based on physical constraints). Responsive to a determination that a waypoint and/or associated orientation violates the safety protocol, the vehicle computing system may reject the waypoint. In some examples, the vehicle computing system may not proceed to a rejected waypoint, such as by not proceeding from a stopping point (e.g., initial location 108) or stopping at a waypoint prior to the rejected waypoint. For example, the vehicle computing device may receive a first waypoint 112(1) and a first orientation 114(1) and may determine that the first waypoint 112(1) and the first orientation 114(1) are valid (e.g., pass safety protocol). The vehicle computing device may navigate the vehicle from the initial position 108 to the first waypoint 112(1). The vehicle computing device may also receive a second waypoint 112(2) and a second orientation 114(2) and may determine that at least one of the second waypoint 112(2) or the second orientation 114(2) do not pass the safety protocol. The vehicle computing device may reject the second waypoint 112(2) and/or the second orientation 114(2) and may cause the vehicle to stop at the first waypoint 112(1) to await updated guidance.

In some examples, the vehicle computing system may send a message to the service computing device indicating the rejection of the waypoint 112 and/or the associated orientation 114. In some examples, the message may include a reason for the rejection. For example, the vehicle computing system may determine that a waypoint is less than a threshold distance from a static object in the environment 100. Based on the determination, the vehicle computing system may reject the waypoint and send a message to the service computing device indicating that the distance is less than the threshold distance.

Responsive to a determination that the waypoint(s) 112 and/or associated orientation(s) 114 pass the safety protocol, the vehicle computing system may accept the waypoint(s) 112 and/or orientation(s) 114. The vehicle computing system may process the waypoint(s) 112 and/or orientation(s) 114 and generate one or more trajectories 116 for the vehicle 102 to transit between waypoints 112. For example, the vehicle computing system may receive a first waypoint 112(1) and a first orientation 114(1). Based on a determination that the first waypoint 112(1) and the first orientation 114(1) are valid, the vehicle computing system may determine a first set of trajectories 116 (one or more trajectories) to transit from an initial position to the first waypoint 112(1) at the first orientation 114(1). In at least some examples, the one or more waypoints 112 may be used as constraints in determining such a trajectory (e.g., the vehicle 102 must pass through the waypoint at a particularly designated yaw angle). In additional or alternative examples, the waypoints may comprise costs in which a trajectory is determined based at least in part on a cost associated with how far the vehicle 102 is from a waypoint and/or a difference in the yaw of the vehicle 102 and the corresponding waypoint 112. In any one or more of the trajectories determined, a velocity may be constrained not to meet or exceed a threshold velocity, which may be a fixed velocity (e.g., 5 mph, 10 mph, etc.) and/or a percentage of the related speed limit over the drivable surface traversed.

Based on the generated trajectories 116, the vehicle computing system may control the vehicle 102 to the waypoint(s) 112 at the associated orientation(s) 114, such as via one or more drive systems. In various examples, the vehicle computing system may receive waypoints 112 and/or associated orientations 114 incrementally. In such examples, the vehicle computing system may control the vehicle from an initial position 108 to the first waypoint 112(1). In some examples, the vehicle computing system may arrive at the first waypoint 112(1) prior to receiving and/or verifying follow-on guidance, such as a second waypoint 112(2). In such examples, the vehicle computing system may cause the vehicle to stop at the first waypoint 112(1) until the second waypoint 112(2) is received and validated. In some examples, the vehicle computing system may receive and/or verify the second waypoint 112(2) prior to arriving at the first waypoint 112(1). In such examples, the vehicle computing device may control the vehicle to maneuver past the first waypoint 112(1) toward the second waypoint 112(2) without stopping. In some examples, the follow-on guidance may be provided while slowing to a stop at a particular waypoint, such as the first waypoint 112(1). In such examples, the vehicle computing device may speed the vehicle back up to an appropriate speed and navigate the vehicle toward the second waypoint 112(2).

In various examples, the vehicle computing device may control the vehicle according to a remote guidance protocol. The remote guidance protocol may include one or more limitations on vehicle 102 movement while operating in the remote guidance mode. The remote guidance protocol may include a path deviation (e.g., distance from a path between two waypoints the vehicle 102 may deviate, such as to circumvent obstacles, ½ width of the vehicle, 1 vehicle width, etc.), response to static object detection (e.g., attempt to circumvent static objects to get to a follow-on waypoint 112, response to dynamic object detection (e.g., yield to agents predicted to enter a path corresponding to the waypoints 112), follow dynamic objects moving in the same direction as the vehicle (e.g., in the path corresponding to the waypoints 112), yield as appropriate for right of way at intersections (e.g., four way stops, traffic lights, roundabouts, etc.), stop forward motion if no further guidance received (e.g., another waypoint, instruction to resume navigation, etc.), or the like.

In various examples, the vehicle computing system may control the vehicle 102 at a velocity appropriate for conditions in the environment. The conditions may include a number and/or type of dynamic objects detected in the environment (e.g., a number of other vehicles on the road, a number of pedestrians, children playing in the vicinity, etc.), a zone associated with the environment (e.g., school zone, playground, etc.), or the like. In some examples, the vehicle computing system may be configured to dynamically determine a maximum velocity of the vehicle to maximize safety while still permitting forward motion. For example, the vehicle computing device may determine that it is in a school zone while operating in a guidance mode. The vehicle computing may determine that a maximum velocity associated with the vehicle 102 is 7 miles per hour, such as to permit an immediate halt of the vehicle 102 upon detection of a student approaching a path associated with the vehicle 102. For another example, the vehicle 102 may be following another vehicle in traffic. The vehicle computing device may control the vehicle 102 at a velocity to maintain a safe distance behind the preceding vehicle.

In various examples, the vehicle computing system may control the vehicle 102 below a pre-determined maximum velocity (e.g., 20 kilometers per hour, 15 miles per hour, 10 miles per hour, etc.). In some examples, the pre-determined maximum velocity may include a maximum velocity associated with remote guidance. In various examples, the vehicle computing system may control the vehicle 102 at or below a velocity associated with the environment and/or the scenario. In at least one example, the vehicle computing system may control the vehicle 102 at the lesser of the pre-determined maximum velocity or the maximum velocity associated with the environment and/or the scenario. For example, a vehicle computing system, when operating in a remote guidance mode, may operate the vehicle at a pre-determined maximum velocity of 15 miles per hour (e.g., a speed between 0 and 15 miles per hour). The vehicle computing system may detect a remote guidance scenario 106 and request guidance input from a service computing device. The vehicle computing system, and/or the operator may determine, based on sensor data, that the remote guidance scenario 106 has associated therewith a speed limit of 10 miles per hour. Based on the speed limit of 10 miles per hour being less than the pre-determined maximum velocity of 15 miles per hour, the vehicle computing system may limit the velocity of the vehicle to no more than 10 miles per hour while navigating through the remote guidance scenario 106.

In various examples, the vehicle computing system may be configured to verify that the vehicle 102 will not violate a safety protocol while navigating through the remote guidance scenario 106 (e.g., traveling waypoint to waypoint). The vehicle computing device may continuously, periodically (e.g., every 0.1 second, 0.5 second, 1 second, etc.), and/or at random intervals (e.g., at 3 seconds, 5 seconds, etc.), monitor the surroundings to ensure safety protocols are met by the vehicle (e.g., the vehicle will not impact an object 118 in the environment). For example, the vehicle computing device may control the vehicle 102 to ensure that the vehicle 102 maintains a minimum distance from an object 118 in the environment.

In various examples, the vehicle computing device may detect one or more objects 118 in the environment 100, such as based on sensor data. The object(s) 118 may be static and/or dynamic objects. In various examples, the vehicle computing system may be configured to determine a classification associated with each of the detected object(s) 118 (e.g., type of object, such as car, semi-trailer truck, pedestrian, bicyclist, etc.). In various examples, the vehicle computing system may determine one or more predicted object trajectories 120 based on the sensor data. The object trajectories 120 may represent any number of potential paths in which the object 118 may travel through the environment 100 from a position associated with a time of perception. The object trajectories 120 may be determined based on a variety of factors, such as a classification of the object 118, traffic laws or rules (e.g., rules of the road), driving etiquette, a location in a turning/non-turning lane, proximity to an intersection, other stationary and/or dynamic objects, drivable surfaces, etc.

In various examples, the object trajectories 120 may be determined utilizing one or more machine learning algorithms. In such examples, the vehicle computing system, such as via a prediction system, may receive the sensor data associated with the object 118 and predict a behavior of the object 118 based on the sensor data. For example, the vehicle computing system may be trained on captured image data of object motion over time such that the vehicle computing system may recognize behavior that may suggest future actions (e.g., object trajectories) the object 118 may take. In some examples, the vehicle computing system may determine predicted object trajectories 120 based on a top-down representation of an environment, such as by utilizing the techniques described in U.S. patent application Ser. No.

16/151,607 filed Oct. 4, 2018 and entitled "Trajectory Prediction on Top-Down Scenes," the entire contents of which are incorporated herein by reference. Additionally, or in the alternative, the vehicle computing system may utilize heat maps, tree search methods, and/or temporal logic formulas, such as those described in the U.S. patent application Ser. No. 15/807,521 filed Nov. 8, 2017 and entitled "Probabilistic Heat Maps for Behavior Prediction," (the entire contents of which are incorporated herein by reference) to determine one or more object trajectories 120 associated with the detected objects 118.

In various examples, the vehicle computing system may process the object trajectories 120 associated with detected object(s) 118 in the environment 100 and may determine whether the vehicle 102 and the object(s) 118 may interact (e.g., a collision, near miss, etc.). For example, a vehicle computing system may control a vehicle 102 from a waypoint 112(8) to a subsequent waypoint 112(N). The vehicle computing system may detect an object 118 (e.g., a pedestrian) with an object trajectory 120 that appears to intersect with a trajectory associated with the vehicle 102. The vehicle computing device may determine that the object 118 may cause the vehicle 102 to violate a safety protocol (e.g., pedestrian within a threshold distance of the vehicle 102 while in motion, etc.) and/or a remote guidance protocol (e.g., object crossing path of the vehicle in remote guidance mode). The vehicle computing system may determine an action to take based on the pedestrian, such as yielding to the pedestrian, to ensure the vehicle 102 maintains the safety protocol and/or remote guidance protocol.

In various examples, the service computing device may determine that a scenario is complete (e.g., vehicle passes the remote guidance scenario 106, can resume normal operations) and may release the vehicle 102 from the remote guidance. In some examples, scenario completion may be based in part on a determination that the vehicle may safely navigate the remainder of the remote guidance scenario 106. For example, an occluded object that was not visible to the vehicle computing system at the initial position 108 is detected by the perception system and the vehicle computing system may be configured to circumnavigate the occluded object. For another example, a first section of the remote guidance scenario 106 may include a violation of an operations protocol, such as traveling in a lane designated for opposite direction traffic. The second section of the remote guidance scenario 106 may include traveling within the bounds of the operations protocol. Thus, the operator may determine that the scenario may be complete based upon completion of the first section (e.g., based upon the vehicle transiting in appropriate lanes for the direction of travel).

In some examples, scenario completion may be based in part on a generated waypoint 112, such as 112(N) being within a threshold distance (e.g., 0.5 meters, 0.5 feet, 10 inches, etc.) of an original route associated with the vehicle 102. In some examples, scenario completion may be based on sensor data input. In such examples, the operator may view the sensor data via the GUI to determine that the scenario is complete. For example, the remote guidance scenario 106 may include a construction zone. A camera feed from the vehicle may depict an end of the construction zone behind the vehicle 102. Based on a determination that the construction zone is behind the vehicle 102, the operator may determine that the scenario is complete.

In various examples, responsive to a determination that the scenario is complete, the service computing device may send a release signal to the vehicle 102. In such examples, responsive to the release signal, the vehicle computing device may be configured to resume navigation of the vehicle 102. In various examples, the service computing device may determine that the scenario blocked a planned route 104 (e.g., initial route) of the vehicle 102. In such examples, the service computing device may be configured to generate an updated route for the vehicle to arrive at a pre-determined destination. In some examples, the service computing device may send the updated route to the vehicle computing device prior to sending the release signal. In some examples, the service computing device may send the updated route substantially concurrently with the release signal (e.g., within 1 second, 2 seconds, etc.). Responsive to receipt of the updated route, the vehicle computing system may control the vehicle 102 along the updated route to the pre-determined destination. In some examples, the vehicle computing device may determine that the scenario blocked the initial route. In such examples, the vehicle computing device may be configured to generate the updated route to navigate to the destination. In various examples, based on a determination that neither the service computing device nor the vehicle computing device may have determined an updated route, the vehicle computing device may cause the vehicle to pull over (e.g., control the vehicle out of the flow of traffic) and stop to determine an updated route and/or receive updated route guidance from the service computing device.

In various examples, after connecting to the service computing device, but prior to receiving guidance data (e.g., waypoint(s) 112 and/or orientation(s) 114), the vehicle computing system may determine a solution for safely navigating the remote guidance scenario 106. In such examples, the vehicle computing system may send a message to the service computing device rescinding the request for remote guidance. In some examples, the service computing device may launch the GUI to enable the operator to observe the vehicle 102 navigating autonomously through the remote guidance scenario 106, such as acting as a safety monitor. In some examples, the service computing device may complete the scenario and may disable input controls associated with the GUI, denying the operator from providing waypoint 112 and/or orientation 114 input.

Figure 2:
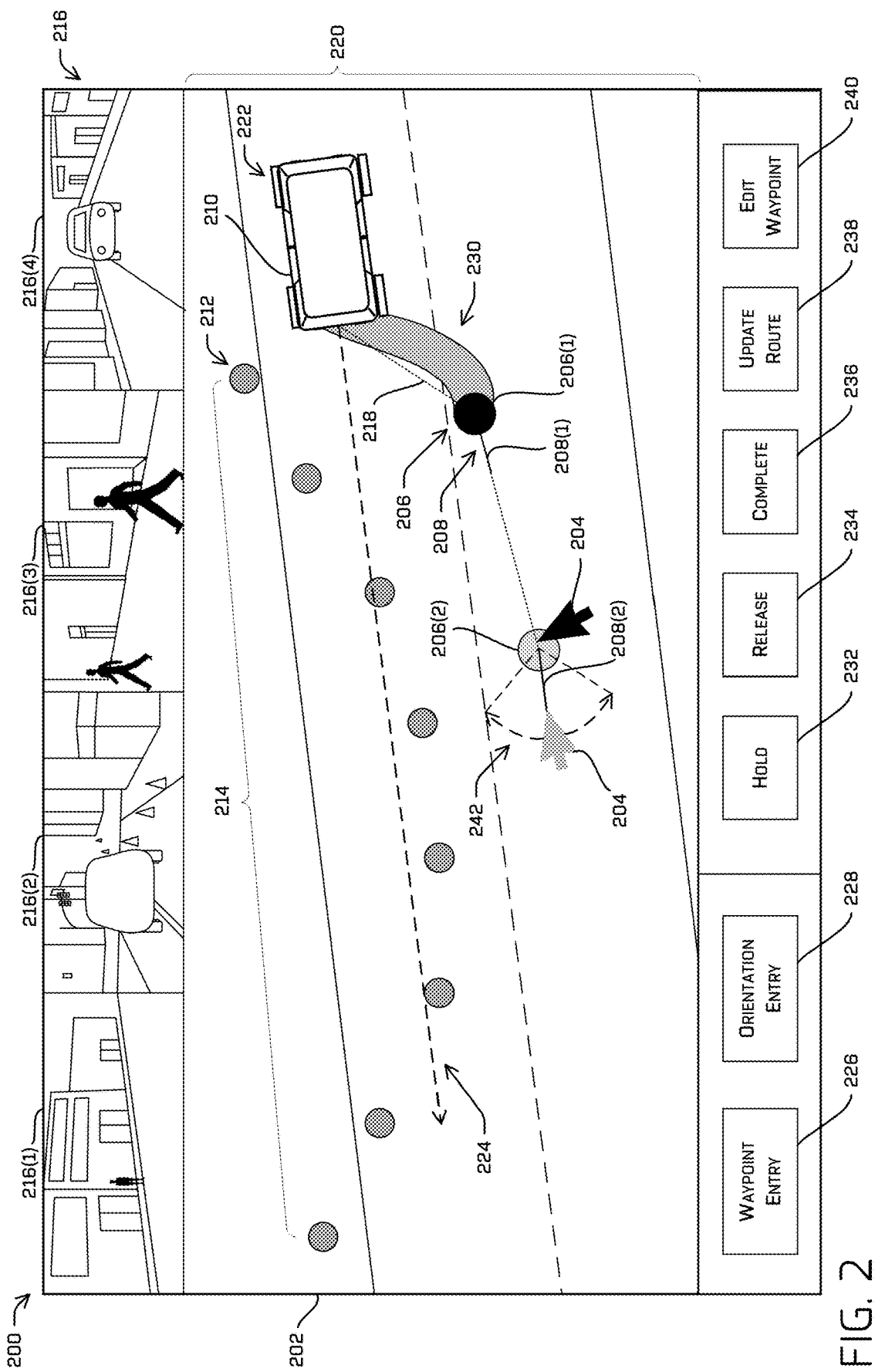
FIG. 2 is an illustration of an example service computing device with a graphical user interface in which an operator may input waypoint and/or orientation guidance for a vehicle operating in a remote guidance mode.

FIG. 2 depicts an example service computing device 200 with a graphical user interface 202 (GUI 202) in which an operator 204 (illustrated as input cursor controlled by operator) may input waypoint 206 and/or orientation 208 guidance, such as waypoints 112 and/or orientations 114, for a vehicle 210, such as vehicle 102, operating in a remote guidance mode. As discussed above, a vehicle computing device associated with the vehicle 210 may detect one or more obstacles 212 comprising a remote guidance scenario 214, such as remote guidance scenario 106. Responsive to detecting the remote guidance scenario 214, the vehicle computing system may establish a connection with the service computing device 200. In various examples, the vehicle computing system may send a request for guidance data (e.g., guidance input) from the service computing device 200. In at least some examples, the vehicle computing system may recognize such a remote guidance scenario 214 before having to make a full and complete stop (e.g., can recognize such a scenario far enough in advance that the techniques discussed herein may cause the vehicle to continue in motion to a destination without stopping).

In various examples, responsive to the connection with the vehicle computing device and/or receipt of the request for guidance data, the service computing device 200 may determine whether one or more conditions for guidance are met. The condition(s) for guidance may include system checks to ensure that the service computing device 200 can effectively provide guidance to the vehicle 210. The condition(s) may include a vehicle velocity below a threshold (e.g., less than 15 miles per hour, less than 20 kilometers per hour, etc.), a threshold number and/or type of sensors are available (e.g., minimum of four cameras providing forward, aft, left, and right views operational, sensors associated with aerial perspective view operational, etc.), threshold bandwidth (e.g., equal to or greater than 10 megabytes per second, 15 megabytes per second, etc.), threshold latency (e.g., equal to or less than 300 milliseconds, 250 milliseconds, etc.), no vehicle health related faults (e.g., steering column fault, etc.), or the like.

In some examples, based on a determination that a condition is not met, the service computing device 200 may communicate the lack of a condition to the vehicle computing device. In such examples, the service computing device 200 may be unable to provide guidance data until the conditions are met (e.g., bandwidth increases, latency decreases, no vehicle health-related faults, vehicle speed decreases below the threshold, sensor data availability increases, etc.). In some examples, based on a determination that the condition is not met, the service computing device 200 may not launch the GUI 202. In some examples, based on a determination that the condition is not met, the service computing device 200 may launch the GUI 202, but may not enable input controls. In such examples, the operator 204 may be unable to provide waypoint 206 and/or orientation 208 guidance. In any such example, the vehicle may execute a fallback maneuver (e.g., maintaining a current position and/or pulling over to a safe stop area).

In various examples, based on a determination that the condition(s) are met, the service computing device 200 may launch the GUI 202 and may not enable input controls. In such examples, the operator 204 may be able to provide waypoint 206 and/or orientation 208 guidance. The GUI 202 may include one or more windows 216 depicting sensor data from one or more sensors on the vehicle 210. In at least one example, the window(s) 216 may depict streaming images captured by a camera on the vehicle 210. The window(s) 216 may depict data to assist the operator in determining a path 218 for the vehicle to take. The path may include a straight line between waypoints, which may or may not be indicative of an actual path 230 the vehicle may traverse through the environment. In some examples, the difference between the path 218 and an actual path 230 may be based, at least in part, on the orientation 208 or direction the vehicle will face at a waypoint 206, such as the first orientation 208(1) associated with the first waypoint 206(1). In such examples, the vehicle computing system may generate an actual path 230 indicative of the one or more trajectories of the vehicle to arrive at the first waypoint 206(1) in the first orientation 208(1). In such examples, trajectories may comprise one or more states to obtain (positions, orientations, velocities, accelerations, etc.) over a finite time horizon and/or between subsequent waypoints. As above, such waypoints may be used to determine such trajectories as costs and/or constraints.

In the illustrative example, the GUI 202 includes a first window 216(1) depicting a left front view, a second window 216(2) depicting a front view, a third window 216(3) depicting a right front view, and a fourth window 216(4) depicting a rear view associated with a vehicle 210. The operator may assess each of the views to determine a path 218 for the vehicle to transit though the remote guidance scenario 214. The path 218 may represent a straight-line distance between an initial position 222 of the vehicle 210 and a first waypoint 206(1) and/or a straight-line distance between waypoints 206, such as between the first waypoint 206(1) and a second waypoint 206(2).

In various examples, the GUI 202 may include a depiction of atop view 220 (e.g., birds-eye view) of the vehicle 210 and the remote guidance scenario 214 which, in at least some examples, may be adjusted according to the operator 204 to provide differing points of view. In some examples, the top view 220 may include a computer-generated view of the environment based on sensor data. In some examples, the top view 220 may initially include a position 222 of the vehicle 210 with respect to the obstacle(s) 212 of the remote guidance scenario 214. In the illustrative example, the top view 220 depicts the vehicle 210 approaching multiple orange cones blocking a planned path 224 (e.g., initial path, planned route, etc.) of the vehicle 210, such as planned route (e.g., planned path) 104.

In various examples, the top view 220 may be configured to receive guidance input from the operator 204. In such examples, the operator 204 may be able to provide guidance to the vehicle to navigate through the remote guidance scenario 214, such as around obstacle(s) 212 associated therewith. The input may include one or more waypoints 206. The waypoint(s) 206 may include locations over which the vehicle will travel. In various example waypoint(s) 206 may each include stopping points, such as absent further guidance. In such examples, the vehicle 210 may be configured to stop at each of the waypoint(s) 206 absent receipt or verification of a subsequent waypoint 206.

In various examples, the operator 204 may select a waypoint entry option 226. In some examples, the waypoint entry option 226 may enable the input of waypoints 206 into the top view 220. In various examples, the operator 204 may input a waypoint using an input device associated with the service computing device 200. Though illustrated as a cursor, such as associated with a mouse, other input devices are contemplated, such as touch screens, keyboards, or the like. The operator 204 may move the cursor over the top view 220 to different potential locations for a waypoint 206. In some examples, a symbol associated with a waypoint 206, such as the second waypoint 206(2) may accompany the cursor. In the illustrative example, the second waypoint 206(2) is depicted as having a light color. In such an example, the light color may represent a waypoint 206 that has not yet been entered by the operator 204. Responsive to an entry, such as by a click of a mouse over a particular location, the waypoint 206 may be entered and the waypoint 206, such as 206(1) may be represented in a different color. In at least some examples, the GUI 202 may preclude the operator 204 from inputting a waypoint more than a certain distance from a previously entered waypoint and/or the last known position of the vehicle.

In various examples, the operator 204 may select an orientation entry option 228. The orientation entry option may enable the operator 204 to input an orientation 208 (e.g., yaw) associated with a waypoint 206. As discussed above, the orientation 208 may represent a direction the vehicle should face at a particular waypoint 206. In some examples, the orientation 208 may be determined based on a previous and/or subsequent waypoint 206. In such examples, the orientation at a particular waypoint 206 may enable the vehicle to smoothly transition between waypoints on a guidance route. In various examples, an orientation 208 associated with a waypoint 206 may be based on a preferred orientation 208 should the vehicle be stopped at the waypoint 206.

In some examples, the GUI 202 may be configured to receive orientation entry on waypoints 206 that have been entered (e.g., placement confirmed). For example, responsive to the operator 204 clicking on (e.g., selecting) the second waypoint 206(2), thereby changing the color to match entered waypoint 206(1), the operator 204 may be able to input an orientation 208 associated therewith, such as orientation 208(2). In the illustrative example, the operator 204 may move a cursor or other input device around the second waypoint 206(2) (e.g., scratch the cursor) and selecting a direction in which the vehicle 210 will face at the second waypoint 206(2). The direction may represent the orientation 208(2) or yaw of the vehicle 210 at the second waypoint 206(2). As discussed above, in various examples, the direction may coincide with the path 218 generated by the GUI 202. In various examples, the movement of the cursor may be confined by an orientation limitation 242. The orientation limitation 242 may include a range of directions in which the orientation 208 may be set. In various examples, the GUI 202 may block orientation input outside the orientation limitation 242. The orientation limitation 242 may be based on a physical constraint placed on the vehicle 210 (e.g. a maximum yaw rate, maximum yaw angle, maximum lateral distance, maximum turn angle, etc.). For example, the top view 220 may not accept orientation input that would cause the vehicle to perform a large turn at a waypoint 206, such as 90-degree or 180-degree turn.

In various examples, the service computing device 200 may be configured to validate the waypoint(s) 206 and/or orientation(s) 208 entered via the GUI. As discussed above, waypoint 206 and/or orientation 208 validation may include a verification that the vehicle 210 will not violate (e.g., pass) a safety protocol and/or a remote guidance protocol associated with the vehicle 210 navigating according to the waypoint 206 and/or orientation 208. In some instances, such validation may comprise a kinematics/dynamics check (validation) which ensures that the vehicle would be capable of performing such a waypoint transition.

In various examples, responsive to receiving guidance input (e.g., waypoint(s) 206 and/or orientation(s) 208), the service computing device 200 may send the waypoint(s) 206 and/or orientation(s) 208 (e.g., waypoint data) to the vehicle computing system. In some examples, the service computing device 200 may send the first waypoint 206(1) and/or first orientation 208(1) prior to receiving input associated with the second waypoint 206(2) and/or second orientation 208(2). In such examples, the vehicle computing system may be configured to receive the first waypoint 206(1) and/or first orientation 208(1) and cause the vehicle to start moving from the initial position 222. Absent receipt of data associated with the second waypoint 206(2), the vehicle computing system may cause the vehicle 210 to stop at the first waypoint 206(1). In various examples, responsive to receipt (and validation) of the second waypoint 206(2) and/or second orientation 208(2), the vehicle computing system may cause the vehicle to proceed toward the second waypoint 206(2). In such examples, the service computing device 200 may enable incremental remote guidance to the vehicle computing system. In some examples, the service computing device 200 may send data associated with two or more waypoints 206 and/or orientations 208. In such examples, based on validation of the two or more waypoints, the vehicle computing system may be configured to navigate between the two or more waypoints 206. In any of the examples described herein, the second waypoint 206(2) may be received as the vehicle is traversing to the first waypoint 206(1) such that the vehicle may continue through all waypoints without stopping.

As discussed above, responsive to receiving a waypoint 206 and/or an orientation 208, such as first waypoint 206(1) and/or first orientation 208(1), the vehicle computing system may generate one or more trajectories for the vehicle 210. The trajectories may represent an actual path 230 of the vehicle 210 traveling between locations while operating in a guidance mode. In various examples, the trajectories associated with the actual path 230 may include trajectories that will result in the vehicle arriving at the first waypoint 206(1) in the first orientation 208(1).

In various examples, the vehicle computing system may send the service computing device an indication that it is unable to proceed beyond a current location. The current location may include a waypoint 206, such as waypoint 206(1), or another location in the environment. In some examples, the vehicle may stop at the current location based on a determination that the vehicle computing device cannot generate the one or more trajectories for the vehicle 210, that a subsequent waypoint 206, such as the second waypoint 206(2), has not yet been received, that a path to the second waypoint 206(2) is obstructed, that a waypoint 206 was rejected, or the like. In some examples, responsive to receiving the indication, the service computing device may present a notification on the GUI 202 indicating that the vehicle is unable to proceed. Based on the notification, the operator may input the second (subsequent) waypoint 206(2) and/or a replacement waypoint 206, such as if the second waypoint 206(2) was rejected.

In various examples, the GUI 202 may enable the operator 204 to cause the vehicle to stop at a particular location. In some examples, the vehicle may stop at a waypoint, such as waypoint 206(1), based on a determination that follow-on guidance has not been received (e.g., data associated with second waypoint 206(2) not received and/or verified). In some examples, the operator 204 may cause the vehicle 210 to stop by selecting the hold option 232. Selection of the hold option 232 may cause the service computing device 200 to send a hold signal to the vehicle 210. In some examples, responsive to receiving the hold signal, the vehicle computing system may control the vehicle to a stop. In some examples, responsive to receiving the hold signal, the vehicle computing system may maintain the vehicle in a stopped position.

In various examples, the vehicle computing system may maintain the stopped position (such as responsive to the hold signal) until a completion signal (e.g., release signal) is received. The completion signal may be sent by the service computing device responsive to input of the release option 234 by the operator 204. In various examples, the completion signal may cause the vehicle computing device to control the vehicle based on guidance input received. In some examples, a hold and release may enable an operator to send multiple waypoints 206 and/or orientations 208 at one time. In some examples, the waypoints 206 and/or orientations 208 entered during a vehicle hold may be sent substantially simultaneously with the completion signal.

In various examples, the GUI 202 may include a completion option 236. The completion option 236 may be selected by the operator responsive to a determination that the vehicle has navigated the remote guidance scenario 214 and may proceed autonomously. In some examples, the completion option 236 may be selected responsive to a determination that a terminating condition has occurred. The terminating condition may include a determination that the remote guidance scenario 214 is behind the vehicle, that the vehicle 210 is within a threshold distance of the planned path 224, that the vehicle 210 is capable of proceeding autonomously (e.g., controlling the vehicle according to the operations protocol, safety protocol, etc.), or the like. In various examples, responsive to selection of the completion option 236, the service computing device 200 may send a completion signal to the vehicle computing device. The completion signal may include an instruction to proceed autonomously. In various examples, the service computing device 200 may determine that the remote guidance scenario 214 blocked the planned path 224 of the vehicle 210 and that the vehicle 210 will proceed along another route (e.g., updated route). In some examples the service computing device 200 may automatically generate an updated route for the vehicle to navigate to a destination. In some examples, the service computing device may generate the updated route based on input by the operator of an update route option 238.

In various examples, the GUI 202 may be configured to receive waypoint edits (e.g., deletion or modification), such as responsive to an edit waypoint option 240 of the GUI 202. The edit waypoint option 240 may enable the operator to delete and/or modify a waypoint 206 (e.g., change a position) and/or an orientation 208 (e.g., change a yaw) associated therewith. The waypoints 206 and/or orientations 208 may be edited based on a determination that a waypoint 206 has not been confirmed (e.g., accepted by the vehicle computing system) or a determination that the waypoint has been confirmed but has not been completed by the vehicle (e.g., the vehicle 210 has not arrived at the waypoint 206, the vehicle has not started along the actual path 230 to the waypoint 206). In various examples, responsive to the determination that the waypoint has been confirmed but not completed, the GUI 202 may verify that the vehicle 210 is stopped prior to enabling waypoint 206 editing. In those example in which the waypoint is currently being used by the vehicle computing system to control the vehicle, the waypoint may be locked for editing. In such examples, this precludes the operator 204 from adjusting a waypoint after it has been used for planning (thereby creating a safer planning process).

Figure 3:
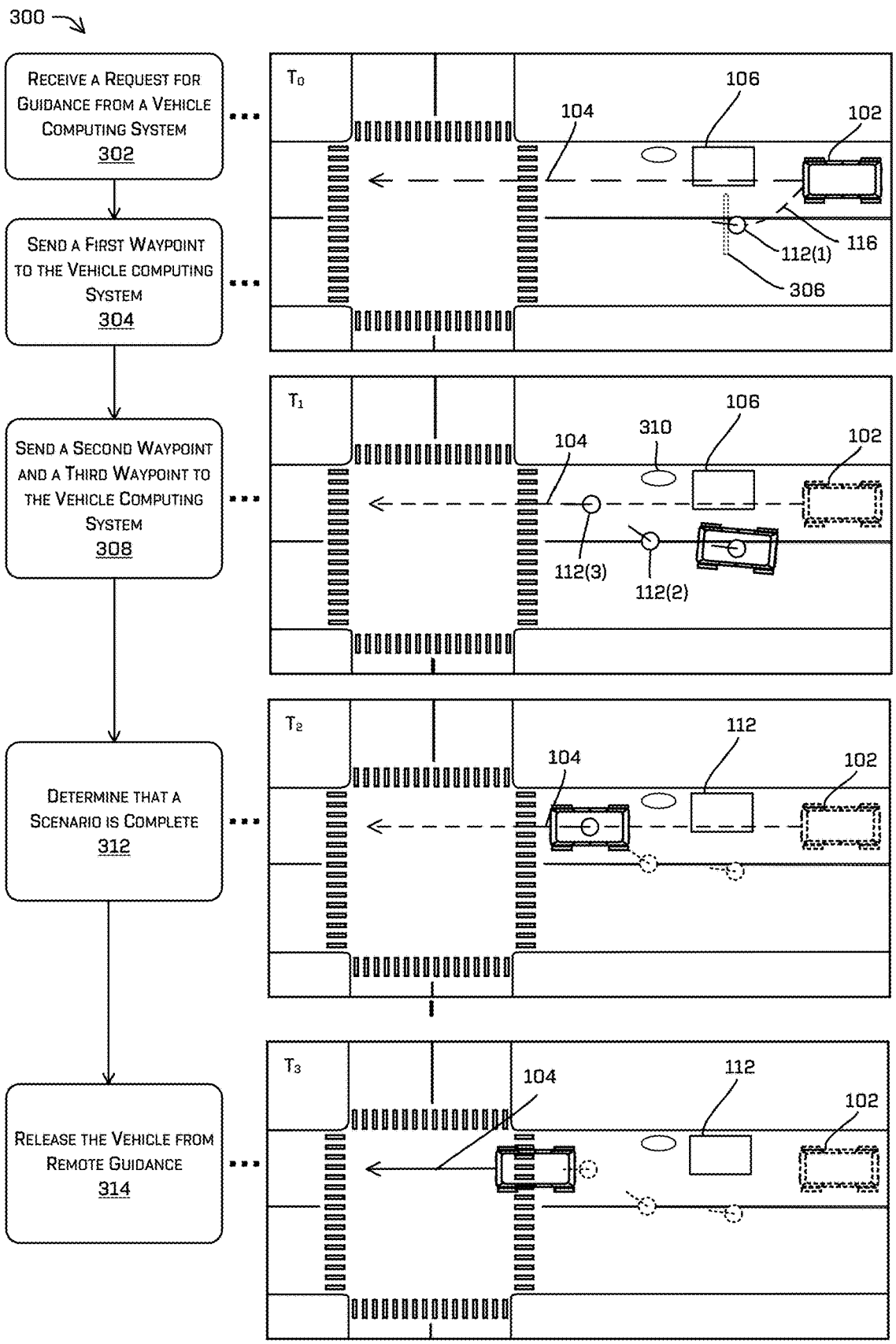
FIG. 3 depicts an example process for providing incremental guidance to a vehicle.

FIG. 3 depicts an example process 300 for providing incremental guidance to a vehicle 102. Some or all of the process 300 may be performed by one or more components described below with regard to FIG. 8.

At operation 302, a service computing device may receive a request for guidance from a vehicle computing system. The vehicle computing system may send the request for guidance based on a detection of a remote guidance scenario 106 in an operating environment. The remote guidance scenario 106 may include an obstacle, road blockage, construction zone in the road, or the like. The remote guidance scenario 106 may include a scenario in which the vehicle computing system is not programmed to perform and/or a scenario that appears to violate an operations protocol and/or a safety protocol associated with the vehicle 102. As above, such a scenario may be detected in anticipation of the vehicle approaching the scenario such that guidance can be relayed prior to stopping so that the vehicle does not have to stop at all.

Responsive to receiving the request for guidance, the service computing device may process the request and launch a graphical user interface (GUI). The GUI may include an interface through which an operator may provide guidance input to the vehicle. The GUI may be configured to receive input corresponding to a first waypoint 112(1) (e.g. first position) for the vehicle to navigate the remote guidance scenario 106 (e.g., around an obstacle). In some examples, the GUI may be configured to receive input corresponding to a first orientation associated with the first waypoint 112(1). The first orientation may represent a direction in which the vehicle 102 may face at the first waypoint 112(1).

At operation 304, the service computing device may send the first waypoint 112(1) (e.g., data associated with a first position and/or the first orientation associated with the first waypoint 112(1)) to the vehicle computing system. The vehicle computing system may receive data associated with the first waypoint 112(1) and may control the vehicle to the first waypoint 112(1). In some examples, the vehicle computing system may additionally control the vehicle 102 based on to the first orientation, such as to cause the vehicle 102 to arrive at the first waypoint 112(1) in the first orientation (and/or within some threshold thereof). In various examples, responsive to not receiving follow-on guidance, the vehicle may stop at the first waypoint 112(1), represented by stop bar 306. In some examples, the vehicle 102 may stop at the stop bar 306 responsive to receiving a hold signal, such as that described above with regard to FIG. 2. In such examples, the service computing device may send the hold signal responsive to receiving an input from the operator to hold the vehicle 102.

At operation 308, the service computing device may send a second waypoint 112(2) and a third waypoint 112(3) to the vehicle computing system. In various examples, the second waypoint 112(2) and the third waypoint 112(3) may be determined based at least in part on an occluded object 310 initially detected at the first waypoint 112(1). The occluded object 310 may include an object that was not initially visible (e.g., detected by sensor systems) to the vehicle computing system upon detection of the remote guidance scenario 106. In some examples, the service computing device may be configured to provide incremental guidance based on a real-time or near real-time detection of obstacles, objects, etc. in the environment.

In various examples, the vehicle computing device may control the vehicle to the second waypoint 112(2) and then to the third waypoints 112(3) without stopping at any waypoint 112. In such examples, the vehicle may proceed without stopping based on a determination that safety protocols are met (e.g., detected objects will not impact travel, etc.).

At operation 312, the service computing device may determine that a scenario (e.g., remote guidance scenario 106) is complete (e.g., terminating condition has occurred). In some examples, the service computing device may determine that the scenario is complete based on a determination, such as using sensor data, that one or more obstacles associated with the remote guidance scenario 106 and/or the occluded object 310 are behind the vehicle. In some examples, the service computing device may determine that the scenario is complete based on a determination that the third waypoint 112(3) (e.g., a final waypoint) is within a threshold distance (e.g., 4 inches, 0.5 feet, 2 feet, 1 meter, etc.) of a planned route 104 of the vehicle. In various examples, the vehicle control system may determine that it is able to plan trajectories for the vehicle 102 that do not violate any control policy (and safely traverse an environment) and send a signal indicative of such to the service computing device. In such examples, the service computing device may determine, based on the signal from the vehicle computing system, that the scenario is complete.

At operation 314, the service computing device may release the vehicle from remote guidance. In some examples, the service computing device may send a completion signal to the vehicle computing system. In some examples, responsive to receiving the completion signal, the vehicle computing system may control the vehicle autonomously. In some examples, the completion signal may include an instruction to proceed autonomously. In such examples, responsive to receiving the instruction, the vehicle computing system may control the vehicle autonomously.

Figure 4:
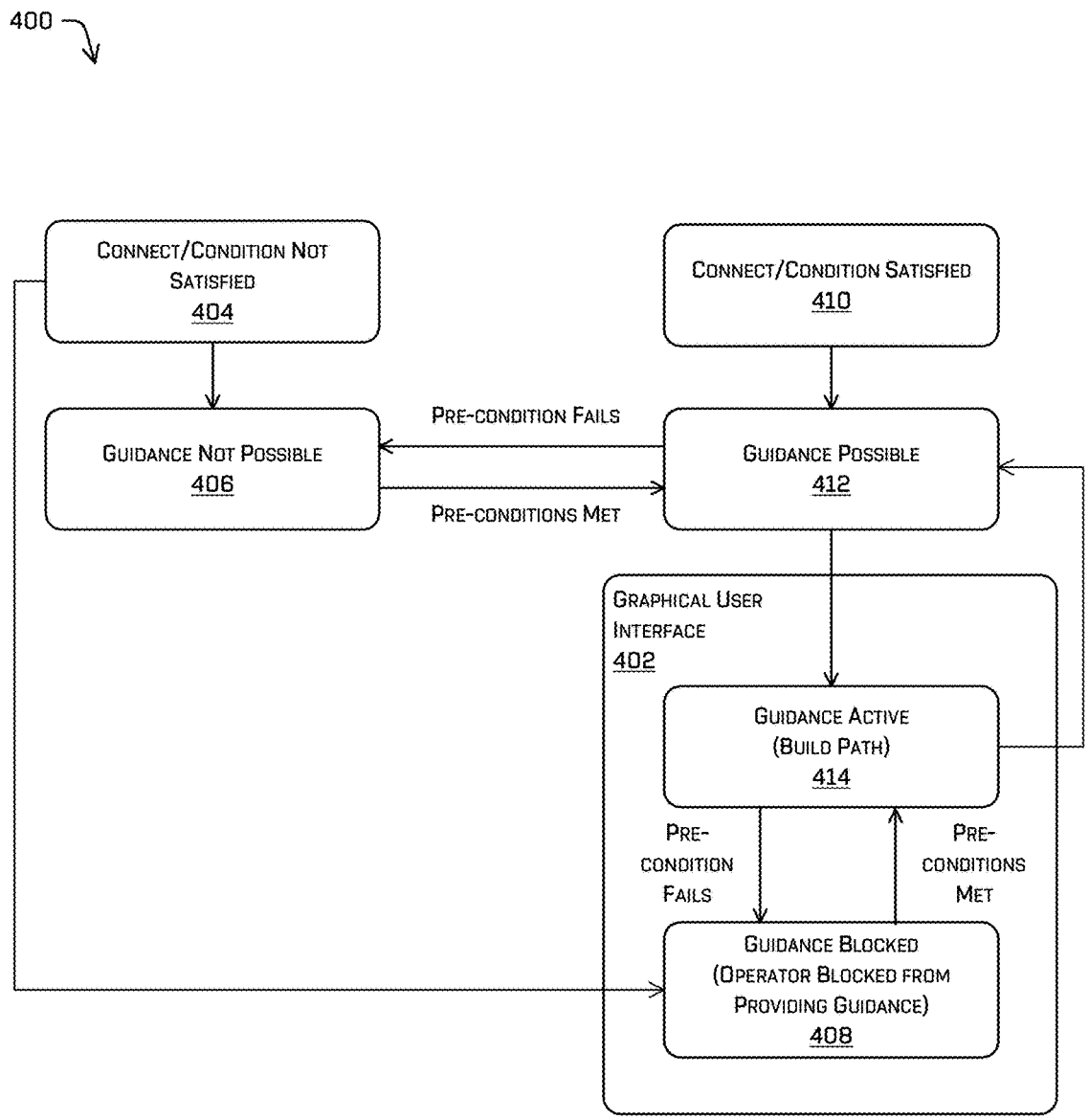
FIG. 4 is an illustration of an example flow diagram depicting an operator workflow for providing remote guidance to a vehicle via a graphical user interface.

FIG. 4 depicts an operator workflow 400 for providing remote guidance to a vehicle via a graphical user interface 402. At operation 404, a vehicle computing system may connect to a service computing device. The service computing device may determine that one or more condition(s) for providing remote guidance is not satisfied. In some examples, the service computing device may determine that the condition(s) are not satisfied based on data received from the vehicle computing system and/or data associated with a network connection. The condition(s) for guidance may include system checks to ensure that the service computing device can effectively provide guidance to the vehicle. The condition(s) may include a current vehicle velocity below a threshold (e.g., less than 15 miles per hour, less than 20 kilometers per hour, etc.), a threshold number and/or type of sensors are available (e.g., minimum of four cameras providing forward, aft, left, and right views operational, sensors associated with aerial perspective view operational, etc.), threshold bandwidth (e.g., equal to or greater than 10 megabytes per second, 15 megabytes per second, etc.), threshold latency (e.g., equal to or less than 300 milliseconds, 250 milliseconds, etc.), no vehicle health related faults (e.g., steering column fault, etc.), or the like.

Based on a determination that at least one condition of the one or more conditions is not satisfied, the service computing device may determine, at operation 406, that guidance is not possible. In various examples, based on a determination that the at least one condition of the condition(s) is not satisfied, the service computing device may, at operation 408, block guidance from being input into the graphical user interface 402. In such an example, an operator may be unable to input waypoint and/or orientation data into the graphical user interface 402.

At operation 410, the vehicle computing system may connect to the service computing device and determine that the condition(s) for providing remote guidance is/are satisfied. Based on a determination that the condition(s) is/are satisfied, the service computing device may determine, at operation 412, that guidance is possible. Responsive to a determination that a condition fails while providing guidance, the service computing device may determine that guidance is not possible, such as that depicted at operation 406. In some examples, based on a determination that guidance is not possible, the vehicle may not proceed beyond an initial position (e.g., may stay stopped). In some examples, based on a determination that guidance is not possible, the service computing device may send the vehicle computing system a message indicating that remote guidance is not possible. In such examples, the message may include a justification for not providing remote guidance (e.g., reason that guidance is not possible). Conversely, responsive to a determination that the at least one condition that previously failed, such as that determined at operation 404, is currently satisfied, the service computing device may determine that guidance is possible (operation 412).

Based on a determination that guidance is possible, the workflow may include, at operation 414, activating guidance on the graphical user interface. In various examples, activating guidance may enable the operator to input data corresponding to waypoints and/or orientations to assist the vehicle in navigating around an obstacle. The operator may thus build a path for the vehicle around the obstacle.

Based on a determination that at least one condition of the condition(s) fails (same or a different condition from the condition described as failing above) while the operator builds the path, further guidance may be blocked at operation 408. In some examples, based on a determination that the at least one condition fails, the vehicle may not proceed beyond an initial position (e.g., may stay stopped) and/or a most recently received and/or validated waypoint. In such examples, the vehicle computing system may be configured to cause the vehicle to stop responsive to not receiving further guidance (e.g., subsequent waypoints, completion signal, etc.). Further, at operation 408, responsive to a determination that the at least one condition is met, the guidance may be re-activated on the graphical user interface 402, enabling additional waypoint and/or orientation data input.

Figure 5:
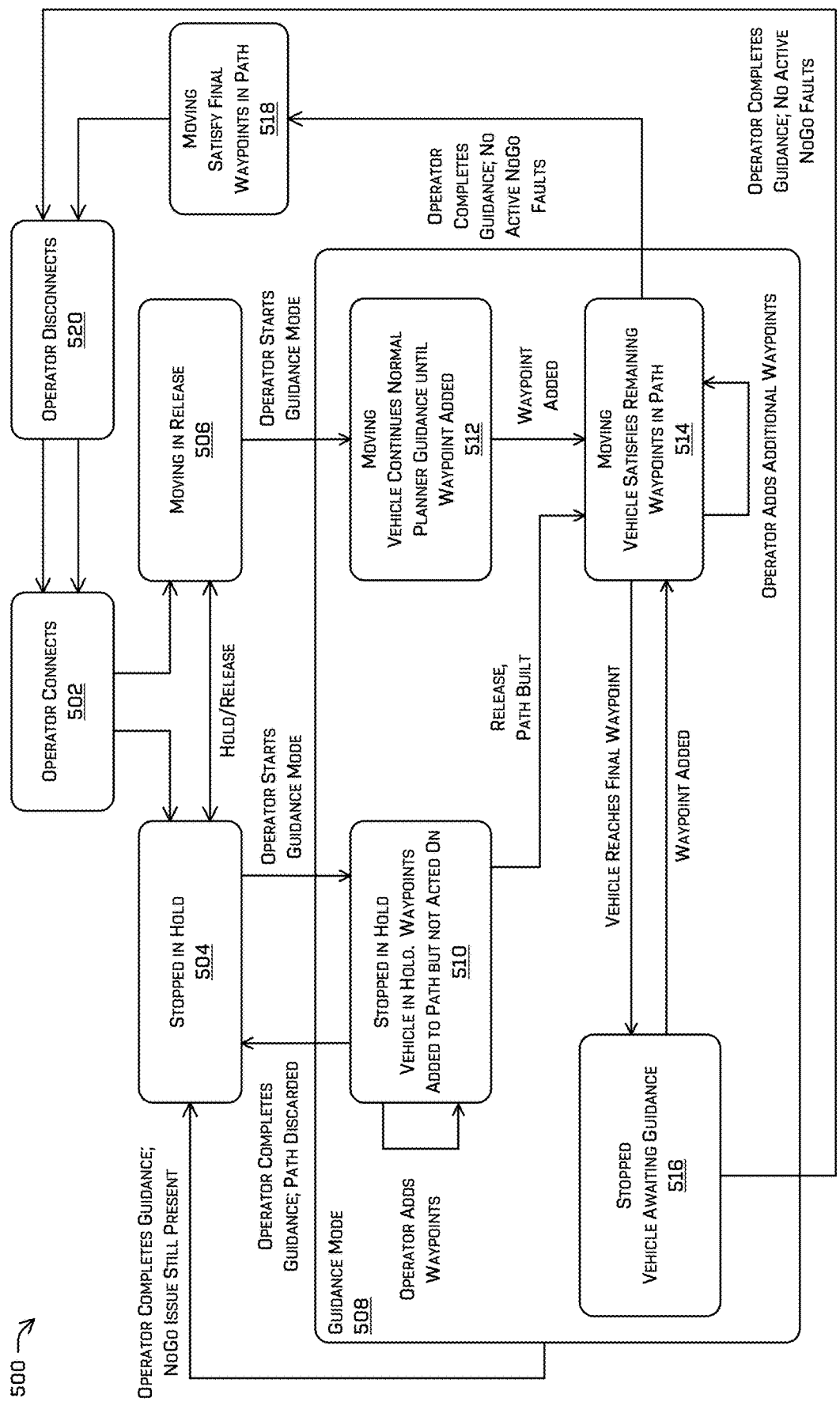
FIG. 5 is an illustration of an example flow diagram depicting vehicle actions responsive to remote guidance input.

FIG. 5 is a flow diagram 500 depicting vehicle actions responsive to remote guidance input. At operation 502, an operator associated with a graphical user interface of a service computing device may connect to a vehicle computing system. In various examples, the operator may connect to the vehicle computing system responsive to receiving a request for remote guidance. In some examples, the connection may be based on a satisfaction of one or more conditions.

At operation 504, the vehicle may be stopped in hold. In various examples, the vehicle may be stopped, such as by the vehicle computing device, based on a detection of a remote guidance scenario. In some examples, the vehicle may be stopped based on an instruction to hold, such as that received from a service computing device via a graphical user interface. The vehicle may be stopped in a Go (e.g., movement authorized) or a NoGo (e.g., movement not authorized) mode. The Go mode may represent a mode in which a temporary delay is necessary prior to forward progress. In some examples, the temporary delay may be based on a time necessary to input and/or validate a waypoint. In some examples, the temporary delay may be based on a satisfaction of a safety protocol and/or remote guidance protocol. For example, the vehicle computing device may detect another vehicle in front of the vehicle has stopped. To maintain a safe distance behind the other vehicle, the vehicle computing device may stop the vehicle in Go mode. The NoGo mode may represent a mode in which remote guidance may not be available, such as based on a condition not being met (e.g., a detected vehicle health fault, etc.), or otherwise that the vehicle has performed a failsafe maneuver and has diverged from nominal driving behavior.

At operation 506, the vehicle may be moving in release. In some examples, the vehicle may move in release based on receipt of a release signal from the service computing device associated with the graphical user interface. In various examples, the vehicle may request remote guidance while moving. From operation 504 or operation 506, an operator may start a guidance mode 508 on a graphical user interface of the service computing device.

At operation 510, the vehicle may be stopped in hold. In some examples, the guidance mode 508 may be active while the vehicle is holding. In such examples, the operator may input waypoints and/or orientations for guidance around an obstacle (e.g., navigating a remote guidance scenario); however, due to the hold, the vehicle may not control the vehicle to traverse the environment according to the waypoints.

At operation 512, the vehicle may continue to move operating normal planner guidance (e.g., autonomous control provided by the vehicle computing system) until data associated with a waypoint is received from the service computing device. Responsive to the operator adding a waypoint, the vehicle, at operation 514, may satisfy one or more waypoints received (e.g., drive to each waypoint). In some examples, responsive to receiving a waypoint, the vehicle computing system may validate the waypoint to ensure the waypoint satisfies a safety protocol and/or a remote guidance protocol of the vehicle.

In various examples, responsive to receiving a waypoint, the vehicle may generate one or more trajectories to control the vehicle to the waypoint. At operation 514, the vehicle computing device may receive data corresponding to one or more additional waypoints from the service computing device (e.g., operator adding additional waypoints in the graphical user interface). The vehicle computing system may continually generate trajectories and control the vehicle between subsequent waypoints based on the trajectories.

In various examples, a vehicle stopped in hold at operation 510 may be released, such as by the operator selecting a release option on the graphical user interface, or the like. In such examples, the vehicle may, at operation 514, start moving and satisfying the remaining waypoints in the path.

At operation 516, the vehicle may stop and await additional guidance. In some examples, the vehicle may stop at operation 516 based on a determination that it has not yet received follow-on guidance (a subsequent waypoint). In such examples, responsive to receiving a waypoint, the vehicle may start moving again (operation 514). In some examples, the vehicle may stop based on a determination that the final waypoint has been satisfied (e.g., vehicle arrived at final waypoint). In some examples, responsive to completion of the guidance, the operator may complete guidance and disconnect from the vehicle computing system, such as at operation 520. In some examples, the operator may cause the service computing device to send a completion message (e.g., completion signal) to the vehicle computing system indicating that the guidance path is complete. Responsive to guidance path completion, the vehicle computing system may resume controlling the vehicle autonomously.

In various examples, the vehicle may continue moving, such as at operation 514 until, at operation 518, the vehicle satisfies a final waypoint in the path. In some examples, the operator may indicate guidance completion prior to the final waypoint, such as by designating a waypoint as the final waypoint. In some examples, responsive to completion of the guidance, the operator may complete guidance and disconnect from the vehicle computing system, such as at operation 520. Responsive to guidance path completion, the vehicle computing system may resume controlling the vehicle autonomously. In various examples, the service computing device may receive a second request for remote guidance. In such examples, the operator may re-connect to the vehicle computing system at operation 502.

Figure 6:
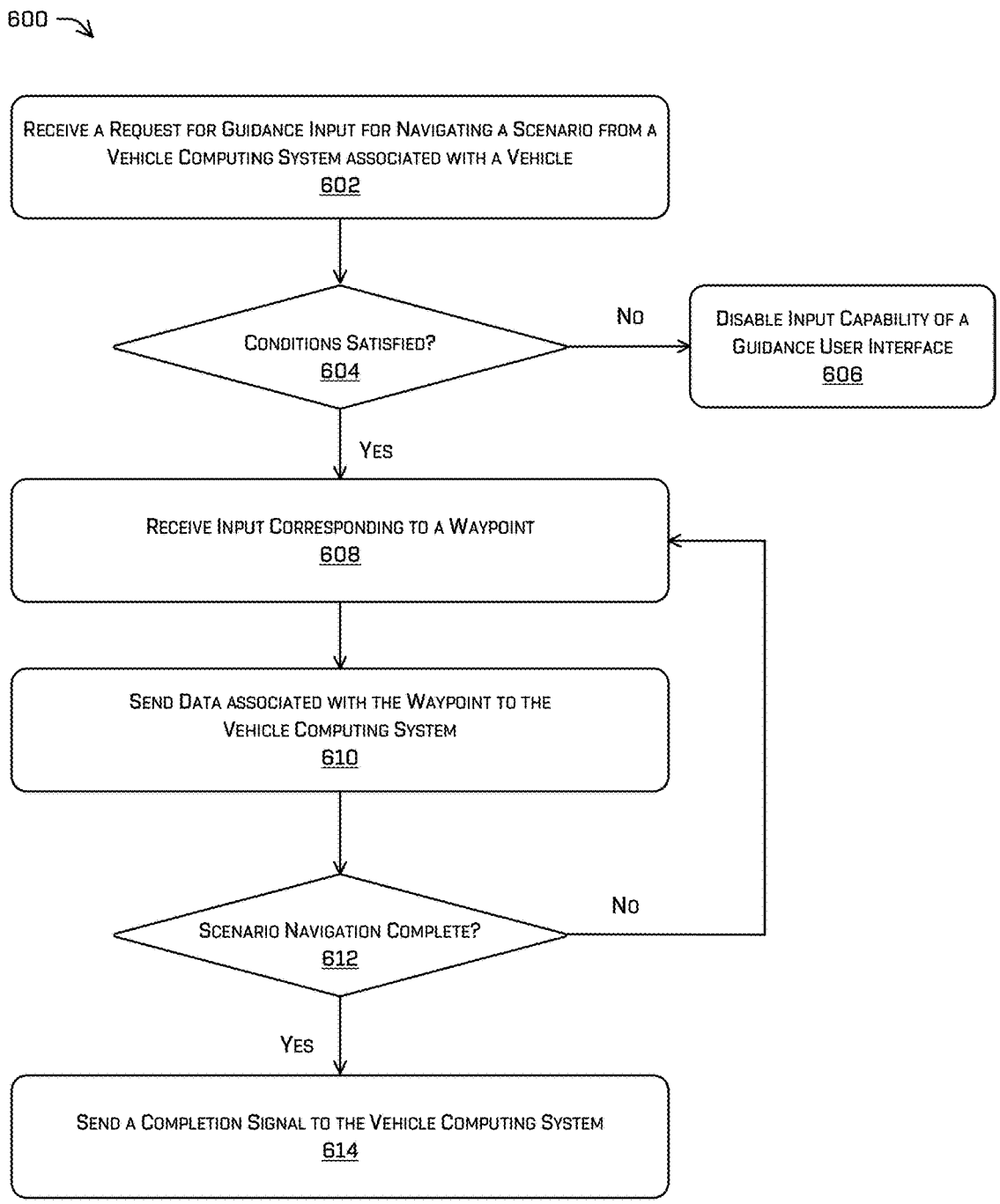
FIG. 6 depicts an example process for providing remote guidance to a vehicle computing device.
Figure 7:
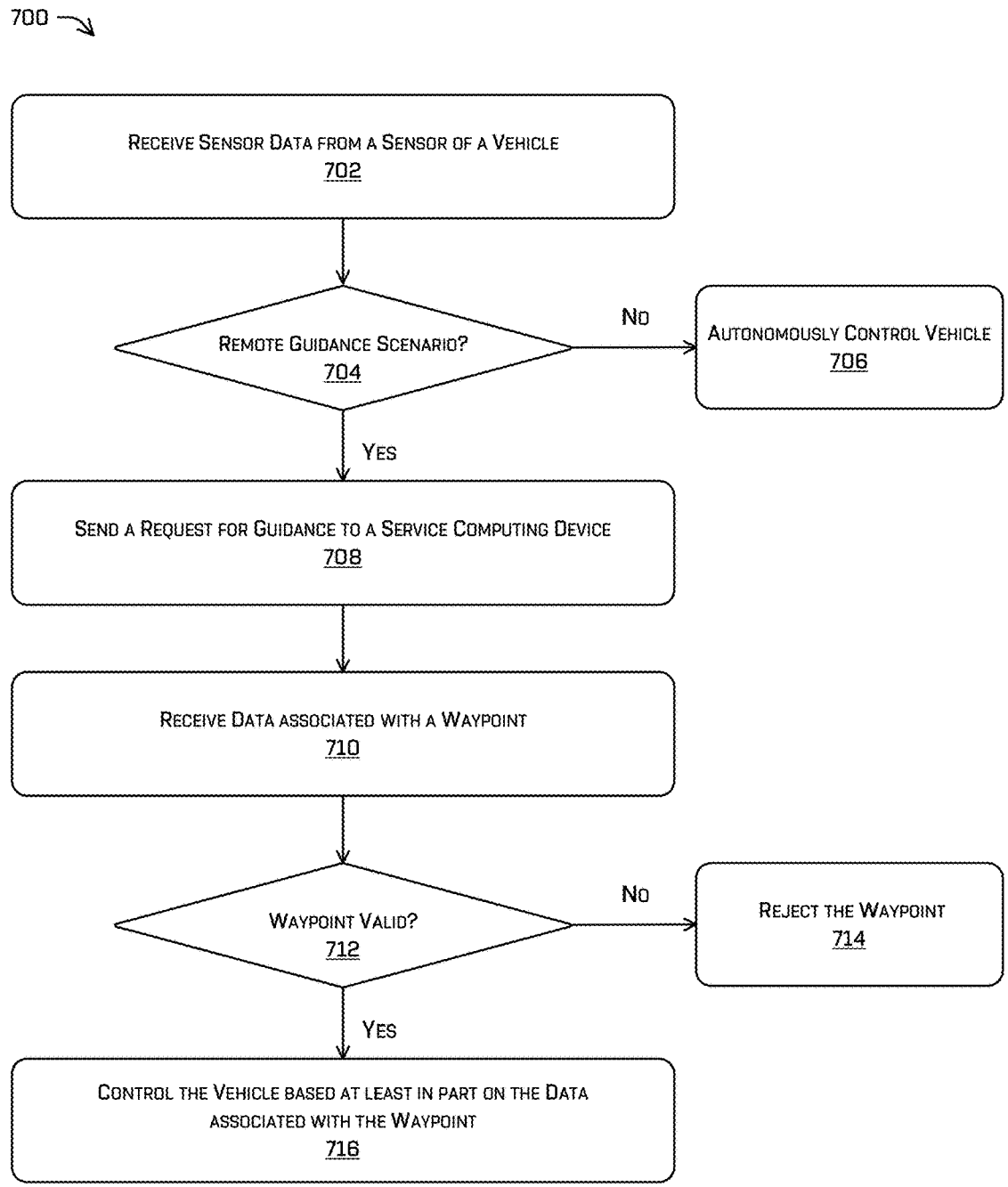
FIG. 7 depicts an example process for controlling a vehicle based on guidance input received from a service computing device.

FIGS. 6 and 7 illustrate example processes in accordance with embodiments of the disclosure. These processes are illustrated as logical flow graphs, each operation of which represents a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes.

FIG. 6 depicts an example process 600 for providing remote guidance to a vehicle computing device. Some or all of the process 600 may be performed by one or more components in FIG. 8, as described herein. For example, some or all of the process 600 may be performed by the service computing device(s) 832.

At operation 602, the process may include receiving a request for guidance input for navigating a scenario from a vehicle computing system associated with a vehicle. The request for guidance input may be received via a network connection between the vehicle computing system and the service computing device. The request for guidance input may include a request for incremental guidance through the scenario, such as via one or more waypoints and/or associated orientations.

At operation 604, the process may include determining whether one or more conditions are satisfied. The conditions may include a vehicle velocity below a threshold, a threshold number and/or type of sensors are available, a threshold bandwidth associated with the network connection, a threshold latency associated with the network connection, absence of a vehicle health related fault, or the like.

Responsive to a determination that at least one condition is not satisfied ("No" at operation 604), the process may include, at operation 606, disabling an input capability of a graphical user interface (GUI) of the service computing device. In some examples, responsive to the determination that the at least one condition is not satisfied, the service computing device may not launch the GUI.

Responsive to a determination that the conditions are satisfied ("Yes" at operation 604), the process may include, at operation 608, receiving input corresponding to a waypoint. The input may be received from an operator associated with the GUI, such as via an input/output device associated with the service computing device. In various examples, the input may include a position and/or orientation (e.g., yaw) of a waypoint. In such examples, the position and/or orientation of the waypoint may represent a location the vehicle will pass while operating in a guidance mode, and a direction the vehicle will face at the location.

In various examples, the service computing device may validate the waypoint and/or orientation associated therewith. A validation of the waypoint may include a verification that the waypoint and/or orientation associated therewith satisfies a safety protocol and/or a remote guidance protocol associated with vehicle operations. The safety protocol may include one or more rules associated with the safe operation of the vehicle, such as a location of the waypoint being on a road (e.g., not less than ½ width of the vehicle from the edge of the road or drivable surface), the waypoint being within a threshold distance of an initial position or within a threshold distance of another waypoint, one or more threshold distances for the vehicle to maintain away from dynamic and/or static objects, maximum yaw rates, and/or other criteria associated with safe navigation of the vehicle through an environment. In additional, or alternative examples, such validation may comprise kinematics and/or dynamics checks to ensure the vehicle is capable of performing transitions from one waypoint to another.

At operation 610, the process may include sending data associated with the waypoint to the vehicle computing system. In some examples, the data may be sent to the vehicle computing system based on a validation of the associated waypoint and/or orientation. In some examples, the data may include a position and/or orientation associated with one or more waypoints. In various examples, the vehicle computing system may validate the waypoint(s) and control the vehicle based in part on the waypoint(s).

At operation 612, the process may include determining whether the scenario navigation is complete. In various examples, the service computing device may determine that the scenario is complete based on a transmission of a final waypoint associated with the scenario. In some examples, the service computing device may identify the final waypoint based on the waypoint being at least threshold distance (e.g., 5 feet, 10 feet, 3 meters, etc.) past an obstacle associated with the scenario. In some examples, the service computing device may identify the final waypoint based on the waypoint being less than a threshold distance (e.g., 4 inches, 1 foot, 1 meter, etc.) from an initial route associated with the vehicle.

Responsive to a determination that the scenario navigation is not complete ("No" at operation 612), the service computing device may return to operation 608 and receive input corresponding to a waypoint. In various examples, the service computing device may continue to receive input corresponding to a waypoint, send data associated with the waypoint to the vehicle computing system until the scenario navigation is complete.

Responsive to a determination that the scenario navigation is complete ("Yes" at operation 612), the process may include, at operation 614, sending a completion signal to the vehicle computing system. In some examples, the completion signal may include an instruction to proceed autonomously to the destination. Responsive to receiving the completion signal, the vehicle computing system may resume normal planner component functionality to autonomously control the vehicle.

In various examples, the service computing device may determine that an initial route associated with the vehicle was blocked due to the scenario. In such examples, the service computing device may determine that the vehicle may not be able to follow the initial route to a destination. In some examples, the service computing device may generate an updated route. In such examples, the service computing device may send the updated route to the vehicle computing device, such as concurrently with or within a threshold time (e.g., 0.5 seconds, 2 seconds, etc.) of sending the completion signal.

FIG. 7 depicts an example process 700 for controlling a vehicle based on guidance input received from a service computing device. Some or all of the process 700 may be performed by one or more components in FIG. 8, as described herein. For example, some or all of the process 700 may be performed by the vehicle computing device(s) 804 (e.g., vehicle computing system).

At operation 702, the process may include receiving sensor data from a sensor of the vehicle. The sensors may include cameras, motion detectors, lidar, radar, time of flight, or the like. The vehicle computing device may be configured, such as by using a perception component, to detect and/or classify one or more dynamic and/or static objects in an environment in which the vehicle operates.

In various examples, the vehicle computing system may process the sensor data to determine one or more actions of the vehicle to take while operating in the environment. The action(s) may be determined based on the dynamic and/or static object(s) detected in the environment. The action(s) may be based on an operations protocol and/or a safety protocol associated with the vehicle. The operations protocol may include one or more rules governing actions the vehicle may or may not take such as not crossing a double yellow line, not driving into oncoming traffic lanes, not exceeding the bounds of a drivable surface of a road, or the like. The safety protocol may include one or more rules associated with the safe operation of the vehicle, one or more threshold distances for the vehicle to maintain away from detected dynamic and/or static objects, maximum yaw rates, and/or other criteria associated with safe navigation of the vehicle through the environment. In some examples, the vehicle computing device may process the sensor data and may be unable to determine an action to take.

At operation 704, the process may include determining, based on the sensor data, whether the vehicle has encountered a remote guidance scenario. The remote guidance scenario may include an obstacle, road blockage, construction zone in the road, driveline beyond vehicle line-of-sight (e.g., sensor vision impaired due to elevation of road and/or turns in a road), or the like. The remote guidance scenario may include a scenario in which the vehicle computing system is not programmed to perform and/or a scenario that appears to violate the operations protocol.

Responsive to determining that the vehicle has not encountered a remote guidance scenario ("No" at operation 704), the process may include, at operation 706, the vehicle computing system autonomously controlling the vehicle, such as in a normal planner mode.

Responsive to determining that the vehicle has encountered a remote guidance scenario ("Yes" at operation 704), the process may include, at operation 708, sending a request for guidance to a service computing device. In various examples, the vehicle computing system may establish a network connection with the service computing device. In such examples, the vehicle computing system may send the request via the network connection. In some examples, an observer in the vehicle may manually establish the network connection between the vehicle computing system and the service computing device. In some examples, the vehicle computing system may automatically establish the network connection and/or send the request for guidance responsive to determining that the vehicle has encountered the remote guidance scenario.

At operation 710, the process may include receiving data associated with a waypoint. The data may include a position and/or an orientation associated with the waypoint.

At operation 712, the process may include determining whether the waypoint is valid. A validation of the waypoint may include a verification that the waypoint and/or orientation associated therewith satisfies a safety protocol, a remote guidance protocol, and/or a kinematics validation associated with vehicle operations. The safety protocol may include one or more rules associated with the safe operation of the vehicle, such as a location of the waypoint being on a road (e.g., not less than ½ width of the vehicle from the edge of the road or drivable surface), the waypoint being within a threshold distance of an initial position or within a threshold distance of another waypoint, one or more threshold distances for the vehicle to maintain away from dynamic and/or static objects, maximum yaw rates, and/or other criteria associated with safe navigation of the vehicle through an environment. The remote guidance protocol may include one or more limitations on vehicle movement while operating in the remote guidance mode. The remote guidance protocol may include a path deviation (e.g., distance from a path between two waypoints the vehicle may deviate, such as to circumvent obstacles, ½ width of the vehicle, 1 vehicle width, etc.), response to static object detection (e.g., attempt to circumvent static objects to get to a follow-on waypoint, response to dynamic object detection (e.g., yield to agents predicted to enter a path corresponding to the waypoints), follow dynamic objects moving in the same direction as the vehicle (e.g., in the path corresponding to the waypoints), yield as appropriate for right of way at intersections (e.g., four way stops, traffic lights, roundabouts, etc.), stop forward motion if no further guidance received (e.g., another waypoint, instruction to resume navigation, etc.), or the like. The kinematics validation may include a verification that the vehicle computing system may generate one or more trajectories to navigate the vehicle to the waypoint at the associated orientation.

Responsive to determining that the waypoint and/or orientation is invalid ("No" at operation 712), the process may include, at operation 714, rejecting the waypoint. In various examples, the vehicle computing system may send a message to the service computing device indicating the rejection of the waypoint. In various examples, the message may include one or more reasons for determining that the waypoint is invalid (e.g., explanation of rejection).

Responsive to determining that the vehicle has encountered a remote guidance scenario ("Yes" at operation 712), the process may include, at operation 716, controlling the vehicle based at least in part on the data associated with the waypoint (e.g., controlling the vehicle at the inclusion of the waypoint). As a non-limiting example, such a waypoint (and/or associated orientation) may be used as one or more of a cost or control for planning a trajectory from one waypoint to the next. Control of the vehicle may include sending one or more signals to one or more drive systems associated with the vehicle and causing the vehicle to either hold a position or move to a different position, such as that associated with the waypoint, and face a particular direction, such as that associated with a determined orientation corresponding to the waypoint.

In at least some examples, if the scenario is not surpassed, such a process may continue to 710 whereby additional waypoints are received and considered. Otherwise, process 700 may continue to 706 to continue autonomously controlling the vehicle.

Figure 8:
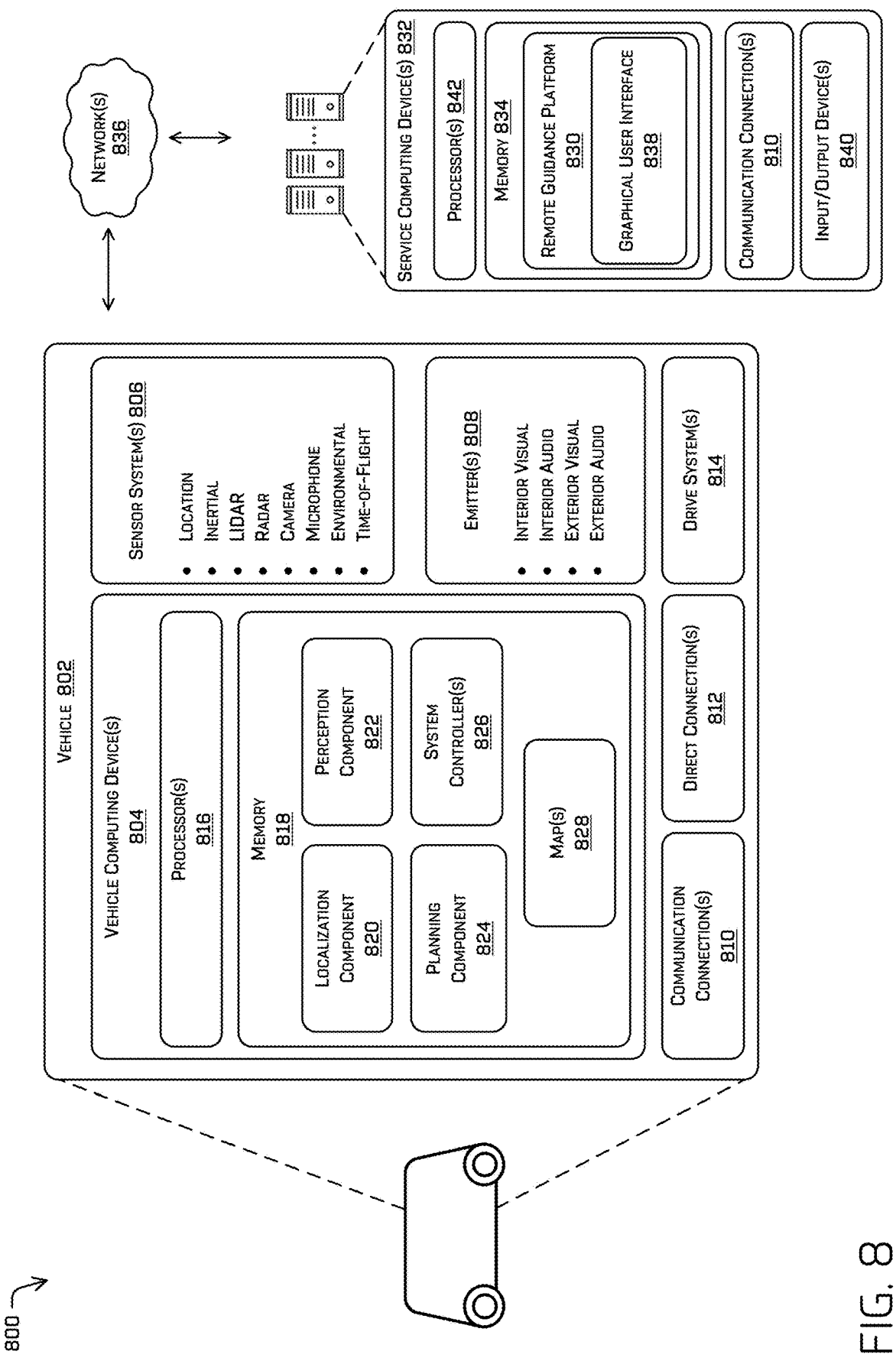
FIG. 8 is a block diagram of an example system for implementing the techniques described herein.

FIG. 8 is a block diagram of an example system 800 for implementing the techniques described herein. In at least one example, the system 800 may include a vehicle 802, such as vehicle 102.

The vehicle 802 may include one or more vehicle computing devices 804, one or more sensor systems 806, one or more emitters 808, one or more communication connections 810, at least one direct connection 812, and one or more drive systems 814.

The vehicle computing device(s) 804 may include one or more processors 816 and memory 818 communicatively coupled with the one or more processors 816. In the illustrated example, the vehicle 802 is an autonomous vehicle; however, the vehicle 802 could be any other type of vehicle, such as a semi-autonomous vehicle, or any other system having at least an image capture device (e.g., a camera enabled smartphone). In the illustrated example, the memory 818 of the vehicle computing device(s) 804 stores a localization component 820, a perception component 822, a planning component 824, one or more system controllers 826, and one or more maps 828. Though depicted in FIG. 8 as residing in the memory 818 for illustrative purposes, it is contemplated that the localization component 820, a perception component 822, a planning component 824, one or more system controllers 826, and one or more maps 828 may additionally, or alternatively, be accessible to the vehicle 802 (e.g., stored on, or otherwise accessible by, memory remote from the vehicle 802, such as, for example, on memory 834 of a service computing device(s) 832).

In at least one example, the localization component 820 may include functionality to receive data from the sensor system(s) 806 to determine a position and/or orientation of the vehicle 802 (e.g., one or more of an x-, y-, z-position, roll, pitch, or yaw). For example, the localization component 820 may include and/or request/receive a map of an environment, such as from map(s) 828 and may continuously determine a location and/or orientation of the autonomous vehicle within the map. In various examples, the map(s) 828 may include road segments identifications (e.g., numbers, etc.) associated with various portions of the roads on the map(s). In some examples, the road segment identifications may be associated with a road network managed at least in part by the service computing device(s) 832. In some instances, the localization component 820 may utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the autonomous vehicle. In some instances, the localization component 820 may provide data to various components of the vehicle 802 to determine an initial position of an autonomous vehicle for determining whether an object is relevant to the vehicle 802, as discussed herein.

In some instances, the perception component 822 may include functionality to perform object detection, segmentation, and/or classification. In some examples, the perception component 822 may provide processed sensor data that indicates a presence of an object (e.g., entity) that is proximate to the vehicle 802 and/or a classification of the object as an object type (e.g., car, pedestrian, cyclist, animal, building, tree, road surface, curb, sidewalk, unknown, etc.). In some examples, the perception component 822 may provide processed sensor data that indicates a presence of a stationary entity that is proximate to the vehicle 802 and/or a classification of the stationary entity as a type (e.g., building, tree, road surface, curb, sidewalk, unknown, etc.). In additional or alternative examples, the perception component 822 may provide processed sensor data that indicates one or more characteristics associated with a detected object (e.g., a tracked object) and/or the environment in which the object is positioned. In some examples, characteristics associated with an object may include, but are not limited to, an x-position (global and/or local position), a y-position (global and/or local position), a z-position (global and/or local position, e.g., height), an orientation (e.g., a roll, pitch, yaw), an object type (e.g., a classification), a velocity of the object, an acceleration of the object, an extent of the object (size), etc. Characteristics associated with the environment may include, but are not limited to, a presence of another object in the environment, a state of another object in the environment, a zone associated with the environment (e.g., school zone, business district, etc.), a time of day, a day of a week, a season, a weather condition, an indication of darkness/light, etc.

In general, the planning component 824 may determine a path, such as planned route 104 (e.g., initial route, planned path, etc.), for the vehicle 802 to follow to traverse through an environment. For example, the planning component 624 may determine various routes and trajectories and various levels of detail. For example, the planning component 824 may determine a route to travel from a first location (e.g., a current location) to a second location (e.g., a target location). In some examples, the planning component 824 may generate an instruction for guiding the autonomous vehicle 802 along at least a portion of the route from a first location to the second location.

In various examples, the planning component 824 may be configured to receive data associated with waypoints and/or orientations for the vehicle 802 operating in a remote guidance mode from a remote guidance platform 830 of one or more service computing devices 832. In some examples, the planning component 824 may be configured to validate the waypoints and/or orientations. In at least one example, the planning component 824 may determine how to guide the autonomous vehicle 802 from a first waypoint received from the service computing device(s) 832 to a second waypoint received from the service computing device(s) 832. In some examples, the instruction may be a trajectory, or a portion of a trajectory. In some examples, multiple trajectories may be substantially simultaneously generated (e.g., within technical tolerances) in accordance with a receding horizon technique, wherein one of the multiple trajectories is selected for the vehicle 802 to navigate.

In some examples, the planning component 824 may include a prediction component to generate predicted trajectories of objects (e.g., objects) in an environment. For example, a prediction component may generate one or more predicted trajectories for dynamic objects detected in an environment. In some examples, the predicted trajectories may include any number of potential paths in which a detected object may travel from a current position (e.g., at the time of perception) and/or based on a direction of travel. In some examples, the predicted trajectories may represent a distance and direction in which the object will travel over a period of time. In some examples, a prediction component may measure a trace of an object and generate a trajectory for the object based on observed and predicted behavior. In various examples, the prediction component may determine predicted trajectories based on one or more of machine learning techniques, heat maps, temporal logic, and/or tree search methods.

In at least one example, the vehicle computing device(s) 804 may include one or more system controllers 826, which may be configured to control steering, propulsion, braking, safety, emitters, communication, and other systems of the vehicle 802. The system controller(s) 826 may communicate with and/or control corresponding systems of the drive system(s) 814 and/or other components of the vehicle 802.

The memory 818 may further include one or more maps 828 that may be used by the vehicle 802 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 802 may be controlled based at least in part on the map(s) 828. That is, the map(s) 828 may be used in connection with the localization component 820, the perception component 822, and/or the planning component 824 to determine a location of the vehicle 802, detect objects in an environment, generate routes, determine actions and/or trajectories to navigate within an environment. In various examples, the map(s) 828 may include a road network. The road network may include one or more distinct road segments.

In some examples, the one or more maps 828 may be stored on one or more service computing device(s) 832. In some examples, multiple maps 828 may be stored based on, for example, a characteristic (e.g., type of entity, time of day, day of week, season of the year, etc.). Storing multiple maps 828 may have similar memory requirements but increase the speed at which data in a map may be accessed.

As can be understood, the components discussed herein (e.g., the localization component 820, the perception component 822, the planning component 824, the one or more system controller(s) 826, and the one or more maps 828 are described as divided for illustrative purposes. However, the operations performed by the various components may be combined or performed in any other component.

In some instances, aspects of some or all of the components discussed herein may include any models, techniques, and/or machine learning techniques. For example, in some instances, the components in the memory 818 (and the memory 834, discussed below) may be implemented as a neural network.

As described herein, an exemplary neural network is a biologically inspired technique which passes input data through a series of connected layers to produce an output. Each layer in a neural network may also comprise another neural network, or may comprise any number of layers (whether convolutional or not). As can be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 806 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 806 may include multiple instances of each of these or other types of sensors. For instance, the lidar sensors may include individual lidar sensors located at the corners, front, back, sides, and/or top of the vehicle 802. As another example, the camera sensors may include multiple cameras disposed at various locations about the exterior and/or interior of the vehicle 802. The sensor system(s) 806 may provide input to the vehicle computing device(s) 804.

The vehicle 802 may also include one or more emitters 808 for emitting light and/or sound. The emitter(s) 808 may include interior audio and visual emitters to communicate with passengers of the vehicle 802. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 808 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 802 and/or the service computing device(s) 832 may also include one or more communication connection(s) 810 that enable communication between the vehicle 802 and the service computing device(s) 832 and/or other local computing device(s) on the vehicle 802 and/or the drive system(s) 814. Also, the communication connection(s) 810 may allow the vehicle 802 to communicate with other nearby computing device(s) (e.g., other nearby vehicles, etc.).

The communications connection(s) 810 may include physical and/or logical interfaces for connecting the vehicle computing device(s) 804 to another computing device or a network, such as network(s) 836. For example, the communications connection(s) 810 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 802 may include one or more drive systems 814. In some examples, the vehicle 802 may have a single drive system 814. In at least one example, if the vehicle 802 has multiple drive systems 814, individual drive system(s) 814 may be positioned on opposite ends of the vehicle 802 (e.g., the front and the rear, etc.). In at least one example, the drive system(s) 814 may include one or more sensor systems to detect conditions of the drive system(s) 814 and/or the surroundings of the vehicle 802. By way of example and not limitation, the sensor system(s) may include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders may be unique to the drive system(s) 814. In some cases, the sensor system(s) on the drive system(s) 814 may overlap or supplement corresponding systems of the vehicle 802 (e.g., sensor system(s) 806).

The drive system(s) 814 may include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 814 may include a drive system controller which may receive and preprocess data from the sensor system(s) and to control operation of the various vehicle systems. In some examples, the drive system controller may include one or more processors and memory communicatively coupled with the one or more processors. The memory may store one or more systems to perform various functionalities of the drive system(s) 814. Furthermore, the drive system(s) 814 may also include one or more communication connection(s) that enable communication by the respective drive system with one or more other local or remote computing device(s).

In at least one example, the direct connection(s) 812 may provide a physical interface to couple the one or more drive system(s) 814 with the body of the vehicle 802. For example, the direct connection(s) 812 may allow the transfer of energy, fluids, air, data, etc. between the drive system(s) 814 and the vehicle. In some instances, the direct connection(s) 812 may further releasably secure the drive system(s) 814 to the body of the vehicle 802.

In at least one example, the localization component 820, the perception component 822, the planning component 824, the one or more system controllers 826, and the one or more maps 828 may process sensor data, as described above, and may send their respective outputs, over the one or more networks 836, to the service computing device(s) 832. In at least one example, the localization component 820, the perception component 822, the planning component 824, the one or more system controllers 826, and the one or more maps 828 may send their respective outputs to the service computing device(s) 832 at a particular frequency, after a lapse of a predetermined period of time, in near real-time, etc.

In some examples, the vehicle 802 may send sensor data to the service computing device(s) 832 via the network(s) 836. In some examples, the vehicle 802 may receive sensor data from the service computing device(s) 832 via the network(s) 636. The sensor data may include raw sensor data and/or processed sensor data and/or representations of sensor data. In some examples, the sensor data (raw or processed) may be sent and/or received as one or more log files.

The service computing device(s) 832 may include one or more processors 842 and the memory 834 storing the remote guidance component 830 with a graphical user interface 838. The graphical user interface 838 may be configured to receive input from an operator representative of one or more waypoints and/or orientations for providing remote guidance to the vehicle 802, such as that described above. The input may be received via one or more input/output devices 840. The input/output device(s) 840 may include one or more of a keyboard, a mouse, a touch screen display, a haptic device, microphone, camera, and/or any other device configured to input and/or output data to/from the service computing device(s) 832.

The processor(s) 816 of the vehicle 802 and the processor(s) 842 of the service computing device(s) 832 may be any suitable processor capable of executing instructions to process data and perform operations as described herein. By way of example and not limitation, the processor(s) 816 and 842 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 818 and 834 are examples of non-transitory computer-readable media. The memory 818 and 834 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 818 and 834 may include at least a working memory and a storage memory. For example, the working memory may be a high-speed memory of limited capacity (e.g., cache memory) that is used for storing data to be operated on by the processor(s) 816 and 842. In some instances, the memory 818 and 834 may include a storage memory that may be a lower-speed memory of relatively large capacity that is used for long-term storage of data. In some cases, the processor(s) 816 and 842 cannot operate directly on data that is stored in the storage memory, and data may need to be loaded into a working memory for performing operations based on the data, as discussed herein.

Example Clauses

A: A system comprising: one or more processors; and memory storing processor-executable instructions that, when executed by the one or more processors, configure the system to: receive, from a vehicle computing system associated with a vehicle operating on a route, a request for guidance to navigate around an obstacle in an environment; receive sensor data associated with one or more sensors of the vehicle; determine that a condition for providing remote guidance is met; generate a signal configured to cause a display to output a representation of the vehicle and the obstacle on a user interface associated with the guidance system, the representation being based at least in part on the sensor data; receive, via the user interface, a first input comprising a first waypoint associated with a first position and a first orientation, wherein the first orientation comprises a first direction for the vehicle to face at the first waypoint; transmit the first waypoint to the vehicle computing system; receive, via the user interface, a second input comprising a second waypoint associated with a second position and a second orientation, wherein the second orientation comprises a second direction for the vehicle to face at the second waypoint; transmit the second waypoint to the vehicle computing system; determine that a terminating condition for providing guidance is met; and transmit an instruction to the vehicle computing system to control the vehicle autonomously.

B: A system as paragraph A describes, wherein the condition comprises at least one of a latency corresponding to a connection with the vehicle computing system being below a threshold latency; a bandwidth corresponding to the connection with the vehicle computing system being below a threshold bandwidth; a velocity of the vehicle being below a threshold velocity; a number of sensors available to provide the sensor data is above a threshold number; or a determination that the vehicle does not comprise an associated health related fault.

C: A system as either one of paragraphs A or B describe, wherein the instructions further configure the system to: determine that the first position, the first orientation, the second position and the second orientation satisfy at least one of a safety protocol associated with operation of the vehicle or a remote guidance protocol, the remote guidance protocol comprising one or more limitations associated with vehicle movement while operating in a remote guidance mode; and validate the first position, the first orientation, the second position, and the second orientation based at least in part on satisfying the at least one of the safety protocol or the remote guidance protocol.

D: A system as any one of paragraphs A-C describe, wherein determining that the terminating condition for providing guidance is met comprises: determining that the second waypoint is within a threshold distance of the route; and determining, based at least in part on the threshold distance, that the obstacle is behind the vehicle.

E: A system as any one of paragraphs A-D describe, wherein the instructions configure the system to: determine that the vehicle is unable to proceed along the route to a destination; generate an updated route for vehicle guidance to the destination; and send the updated route to the vehicle computing system, wherein the instruction to proceed autonomously includes the updated route.

F: A method comprising: receiving, from a vehicle computing device associated with a vehicle, a request for guidance input for navigating around an obstacle; receiving, as received data and from the vehicle computing device, sensor data or data based at least in part on the sensor data; receiving, via a user interface associated with a guidance system, a first input corresponding to a first waypoint, the first input being based at least in part on the received data; sending first data associated with the first waypoint to the vehicle computing device; and causing the vehicle to be controlled based at least in part on the first waypoint.

G: A method as paragraph F describes, further comprising determining that a condition for providing remote guidance is satisfied, the condition comprising at least one of: a latency corresponding to a connection with the vehicle computing device being below a threshold latency; a bandwidth corresponding to the connection with the vehicle computing device being below a threshold bandwidth; a velocity of the vehicle being below a threshold velocity; a number of sensors available to provide the received data is equal to or greater than a threshold number; or a determination that the vehicle does not comprise an associated health related fault.

H: A method as either of paragraphs F or G describe, further comprising: determining, at a first time, that a condition for providing remote guidance is satisfied; enabling inputs into the user interface based at least in part on the condition being satisfied; determining, at a second time, that the condition for providing remote guidance is not satisfied; and disabling the inputs into the user interface based at least in part on the condition not being satisfied.

I: A method as any one of paragraphs F-H describe, further comprising: determining that the first waypoint satisfies at least one of a safety protocol associated with operation of the vehicle or a remote guidance protocol, the remote guidance protocol comprising one or more limitations associated with vehicle movement while operating in a remote guidance mode; and validating the first waypoint based at least in part on satisfying the at least one of the safety protocol or the remote guidance protocol, wherein sending the first data is based at least in part on validating the first waypoint.

J: A method as any one of paragraphs F-I describe, further comprising: receiving a second input corresponding to a second waypoint; sending second data associated with the second waypoint to the vehicle computing device; and receiving a rejection message from the vehicle indicating rejection of the second waypoint based at least in part on at least one of a safety protocol or a remote guidance protocol corresponding to operation of the vehicle.

K: A method as any one of paragraphs F-J describe, wherein the first input comprises: a first location associated with the first waypoint, the first location corresponding to a selectable area of the user interface; and a first orientation corresponding to a first direction the vehicle will face at the first waypoint.

L: A method as any one of paragraphs F-K describe, further comprising: sending a hold signal to the vehicle, the hold signal causing the vehicle computing device to hold at a position; and sending a release signal to the vehicle, wherein the release signal comprises an instruction to the vehicle computing device to control the vehicle to the first waypoint.

M: A method as any one of paragraphs F-L describe, receiving a second input corresponding to a second waypoint; sending second data associated with the second waypoint to the vehicle computing device; determining that the second waypoint corresponds to a terminating condition associated with the obstacle; and sending an instruction to the vehicle computing device to autonomously control the vehicle after completing an operation associated with the second waypoint.

N: A method as any one of paragraphs F-M describe, further comprising: receiving a second input corresponding to a second waypoint; sending second data associated with the second waypoint to the vehicle computing device; receiving, via the user interface, a third input indicating an operator intention to edit at least one of the first waypoint or the second waypoint; determining that the vehicle is in transit to the first waypoint; disabling a first edit to the first waypoint; determining that at least one of the second waypoint has not been accepted by the vehicle computing device or the vehicle has not advanced beyond the first waypoint; enabling a second edit to the second waypoint; and sending an instruction to the vehicle computing device to at least one of delete or modify the second waypoint.

O: A system or device comprising: a processor; and a non-transitory computer-readable medium storing instructions that, when executed, cause a processor to perform a method as any one of paragraphs F-N describe.

P: A system or device comprising: a means for processing; and a means for storing coupled to the means for processing, the means for storing including instructions to configure one or more devices to perform a method as any one of paragraphs F-N describe.

Q: A non-transitory computer-readable medium storing instructions that, when executed, cause one or more processors to perform operations comprising: receiving, from a vehicle computing device associated with a vehicle, a request for guidance input for navigating around an obstacle; receiving, as received data and from the vehicle computing device, sensor data or data based at least in part on the sensor data; receiving, via a user interface associated with a guidance system, a first input corresponding to a first waypoint, the first input being based at least in part on the received data; sending first data associated with the first waypoint to the vehicle computing device; and causing the vehicle to be controlled based at least in part on the first waypoint.

R: A non-transitory computer-readable medium as paragraph Q describes, the operations further comprising: receiving, via the user interface, a second input indicating a command for the vehicle to stop; and sending an instruction to the vehicle computing device to stop at a location associated with a current location.

S: A non-transitory computer-readable medium as either of paragraphs Q or R describe, the operations further comprising: determining that the vehicle is stopped at a location; and sending an instruction to release the vehicle from a stopped position, wherein the vehicle may proceed forward based at least in part on the instruction.

T: A non-transitory computer-readable medium as any one of paragraphs Q-S describe, the operations further comprising: receiving a second input corresponding to a second waypoint; sending second data associated with the second waypoint to the vehicle computing device; receiving, via the user interface, a third input indicating an operator intention to edit at least one of the first waypoint or the second waypoint; determining that the vehicle is in transit to the first waypoint; disabling a first edit to the first waypoint; determining that at least one of the second waypoint has not been accepted by the vehicle computing device or the vehicle has not advanced beyond the first waypoint; enabling a second edit to the second waypoint; and sending an instruction to the vehicle computing device to at least one of delete or modify the second waypoint.

U: A non-transitory computer-readable medium as any one of paragraphs Q-T describe, the operations further comprising: receiving an indication that the vehicle is unable to proceed from a location; presenting, via the user interface, the indication that the vehicle is unable to proceed from the location; receiving, via the user interface, a second input corresponding to a second waypoint; and transmitting the second waypoint to the vehicle computing system.

V: A non-transitory computer-readable medium as any one of paragraphs Q-U describe, the operations further comprising: determining that the first waypoint satisfies a kinematics check associated with vehicle control; and validating the first waypoint based at least in part on satisfying the kinematics check, wherein causing the vehicle to be controlled is based at least in part on validating the first waypoint.

W: A vehicle comprising: a sensor; one or more processors; and memory storing processor-executable instructions that, when executed by the one or more processors, configure the vehicle to: determine a path for the vehicle to traverse through an environment to reach a destination; receive sensor data from the sensor; generate, based at least in part on the sensor data, a first trajectory for the vehicle to traverse along the path; determine, based at least in part on the first trajectory, that the vehicle is unable to continue along the path based at least in part on one or more of an obstacle or a control policy; transmit, to a service computing device, a request for guidance data; receive, from the service computing device, waypoint data comprising a waypoint associated with a position and an orientation; validate the waypoint based at least in part on a safety protocol; based at least in part on a validation of the waypoint, determine a second trajectory for the vehicle to navigate the vehicle from an initial position and an initial vehicle orientation to the position and the orientation associated with the waypoint; and control the vehicle based at least in part on the second trajectory.

X: A vehicle as paragraph W describes, wherein the instructions further program the one or more processors to: receive a message indicating release of the service computing device as a remote guidance platform; determine a third trajectory to control the vehicle from the waypoint along the path; and control the vehicle based at least in part on the third trajectory.

Y: A vehicle as either one of paragraphs W or X describe, wherein the waypoint data comprises a first waypoint data comprising a first waypoint associated with a first position and a first orientation and wherein the instructions further configure the vehicle to: receive, from the service computing device, second waypoint data comprising a second waypoint associated with a second position and a second orientation; validate the second waypoint based at least in part on the safety protocol; and based at least in part on validating the second waypoint, determine a third trajectory for the vehicle to navigate the vehicle from the first waypoint to the second waypoint; and control the vehicle from the first waypoint to the second waypoint based at least in part on the third trajectory, wherein the vehicle is controlled from the first waypoint to the second waypoint without stopping forward motion.

Z: A vehicle as any one of paragraphs W-Z describe, wherein the instructions further configure the vehicle to: detect, based at least in part on the sensor data, a dynamic object in the environment; determine an object trajectory associated with the object; determine that the object the object trajectory will traverse within a threshold distance of the vehicle traveling on the trajectory for the vehicle; and control the vehicle based at least in part on the object.

AA: A vehicle as any one of paragraphs A-D describe, wherein the instructions further configure the vehicle to: receive second waypoint data associated with a second position and a second vehicle orientation; determine that at least one of the second waypoint or the second vehicle orientation violates the safety protocol; and cause the vehicle to stop at the first waypoint.

AB: A method comprising: receiving sensor data from a sensor of a vehicle operating along a path in an environment; determining that the vehicle is unable to continue along the path based at least in part on a control policy; sending, to a service computing device, a request for guidance data, the guidance data comprising a waypoint to facilitate control of the vehicle through the scenario; receiving waypoint data associated with the waypoint from the service computing device; determining that the waypoint is a valid waypoint; and controlling the vehicle based at least in part on the waypoint.

AC: A method as paragraph AB describes, further comprising: receiving a vehicle orientation associated with the waypoint; determining that the vehicle orientation is a valid vehicle orientation; and controlling the vehicle based at least in part on the vehicle orientation.

AD: A method as either one of paragraphs AB or AC describes, wherein determining that the waypoint is the valid waypoint comprises determining at least one of determining that the waypoint is located on a drivable surface; determining that an operation of the vehicle navigating to the waypoint does not violate a remote guidance protocol, the remote guidance protocol comprising a limitation associated with vehicle movement while operating in a remote guidance mode; or determining that the operation of the vehicle navigating to the waypoint does not violate a safety protocol, wherein the safety protocol comprises a condition to ensure the safety of the vehicle.

AE: A method as any one of paragraphs AB-AD describe, wherein the scenario is identified in an environment associated with the vehicle, the method further comprising: receiving, from the service computing device, an updated route for navigating through the environment based at least in part on the scenario; receiving a message indicating release of the service computing device as a remote guidance platform; and controlling the vehicle based at least in part on the updated route.

AF: A method as any one of paragraphs AB-AE describe, wherein the scenario is identified on a route associated with the vehicle, the method further comprising: receiving, from the service computing device, a message indicating release of the service computing device as a remote guidance platform; controlling the vehicle based at least in part on the route; identifying a second scenario on the route that violates the operating constraint; sending, to the service computing device, a second request for guidance data; determining a solution to the second scenario independent of input from the service computing device; and controlling the vehicle based at least in part on the solution.

AG: A method as any one of paragraphs AB-AF describe, wherein waypoint data associated with the waypoint comprises first data associated with a first waypoint, the method further comprising: receiving second waypoint data associated with a second position and a second vehicle orientation; determining that at least one of the second waypoint or the corresponding vehicle orientation violates a safety protocol;

and based at least in part on determining that the second waypoint violates the safety protocol, causing the vehicle to stop at the first waypoint.

AH: A method as any one of paragraphs AB-AG describe, wherein determining that the vehicle is unable to continue along the path comprises: determining the path for the vehicle to traverse through an environment; generating, based at least in part on the sensor data, a trajectory for the vehicle to traverse along the path; and determine that the trajectory violates the control policy.

AI: A method as any one of paragraphs AB-AH describe, further comprising: receiving second waypoint data associated with a second waypoint and a corresponding vehicle orientation; validating the second waypoint and the corresponding vehicle orientation; and controlling the vehicle from the first waypoint to the second waypoint without stopping forward motion.

AJ: A method as any one of paragraphs AB-AI describe, wherein the control policy comprises at least one of: a traffic law or rule; a rule of good driving; or an obstacle in a path of the vehicle.

AK: A system or device comprising: a processor; and a non-transitory computer-readable medium storing instructions that, when executed, cause a processor to perform a method as any one of paragraphs AB-AJ describe.

AL: A system or device comprising: a means for processing; and a means for storing coupled to the means for processing, the means for storing including instructions to configure one or more devices to perform a method as any one of paragraphs AB-AJ describe.

AM: A non-transitory computer-readable medium storing instructions that, when executed, cause one or more processors to perform operations comprising: receiving sensor data from a sensor; determining that the vehicle is unable to continue along a path based at least in part on a control policy; sending, to a service computing device, a request for guidance data, the guidance data comprising a waypoint to facilitate control of the vehicle through the scenario; receiving waypoint data associated with the waypoint from the service computing device; determining that the waypoint is a valid waypoint; and controlling the vehicle based at least in part on the waypoint.

AN: A non-transitory computer-readable medium as paragraph AM describes, the operations further comprising: receiving orientation data corresponding to an orientation associated with the waypoint; determining that the orientation is a valid orientation; and controlling the vehicle based at least in part on the orientation.

AO: A non-transitory computer-readable medium as either one of paragraphs AM or AN describe, wherein controlling the vehicle based at least in part on the waypoint comprises: determining a vehicle trajectory from an initial position associated with identifying the scenario to the waypoint; and causing a drive system to operate the vehicle based at least in part on the vehicle trajectory.

AP: A non-transitory computer-readable medium as any one of paragraphs AM-AO describe, wherein the waypoint data associated with the waypoint comprises first waypoint data associated with a first waypoint received at a first time, the operations further comprising: receiving, from the service computing device, second waypoint data associated with a second waypoint at a second time; determining that the second waypoint is valid; and controlling the vehicle based at least in part on the second waypoint, wherein the vehicle is configured to transition from the first waypoint to the second waypoint without stopping.

AQ: A non-transitory computer-readable medium as any one of paragraphs AM-AP describe, wherein the waypoint data associated with the waypoint comprises first waypoint data associated with a first waypoint received at a first time, the operations further comprising: determining that the vehicle is within a threshold distance of the first waypoint; determining that second waypoint data associated with a second waypoint has not been received; and causing the vehicle to stop at the first waypoint.

AR: A non-transitory computer-readable medium as any one of paragraphs AM-AQ describe, wherein the scenario is identified in an environment associated with the vehicle, the operations further comprising: receiving, from the service computing device, a message indicating release of the service computing device as a remote guidance platform; controlling the vehicle based at least in part on the route; identifying a second scenario on the route that violates the operating constraint; sending, to the service computing device, a second request for guidance data; determining a solution to the second scenario independent of input from the service computing device; and controlling the vehicle based at least in part on the solution.

While the example clauses described above are described with respect to one particular implementation, it should be understood that, in the context of this document, the content of the example clauses may also be implemented via a method, device, system, a computer-readable medium, and/or another implementation. Additionally, any of examples A-AR may be implemented alone or in combination with any other one or more of the examples A-AR.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
memory storing processor-executable instructions that, when executed by the one or more processors, configure the system to:
transmit, from a vehicle, a request for guidance input for navigating in response to an event;
receive a waypoint including an orientation and a position, wherein the orientation indicates a yaw of the vehicle at the position;

determine, based at least in part on the position and the orientation of the waypoint, a violation indicating that the waypoint violates a safety protocol; and based at least in part on determining the violation, refrain from controlling the vehicle based at least in part on the waypoint.

2. The system of claim 1, wherein the request for guidance input is a first request and the waypoint is a first waypoint, wherein the instructions further configure the system to:

transmit, from the vehicle, a second request for guidance input for navigating in response to the event;

receive a second waypoint associated with a second orientation and a second position;

determine, as a validation, that the second waypoint complies with the safety protocol and that additional information received indicates a condition being met; and based at least in part on the validation, control the vehicle based at least in part on the second waypoint.

3. The system of claim 2, wherein prior to transmitting the request for guidance the vehicle is being controlled in accordance with a trajectory, and wherein the instructions further configure the system to:

based at least in part on controlling the vehicle based at least in part on the second waypoint, cause the vehicle to resume controlling the vehicle based in accordance with the trajectory.

4. The system of claim 1, wherein determining the violation further comprises:

receiving additional information associated with a connection with a remote guidance computing device, the additional information including a latency and a bandwidth of the connection; and determining at least one of:
the latency being above a threshold latency, or
the bandwidth being below a threshold bandwidth.

5. The system of claim 4, wherein determining the violation further includes determining at least one of:

a velocity of the vehicle is above a threshold velocity,
a number of sensors available to provide sensor data is below a threshold number, or
that the vehicle is associated with a health related fault.

6. The system of claim 1, wherein the vehicle is being controlled in accordance with a trajectory, and wherein the instructions configure the system to:

receive a hold signal, wherein the hold signal instructs the vehicle to hold at a hold position; and based at least in part on receiving the hold signal, cause the vehicle to hold at the hold position.

7. The system of claim 1, wherein the one or more processors are on-board the vehicle, and the instructions further configure the system to:

determine, based on the waypoint, a trajectory of the vehicle from a current position and a current orientation of the vehicle to the orientation and the position included in the waypoint, wherein determining the violation is further based on the trajectory.

8. A method comprising:
transmitting, from a vehicle, a request for guidance;
receiving a waypoint including an orientation and a position;
determining, based at least in part on the position and the orientation of the waypoint, a violation indicating that the waypoint violates a safety protocol; and based at least in part on determining the violation, refraining from controlling the vehicle based at least in part on the waypoint.

9. The method of claim 8, further comprising:
receiving a hold signal, wherein the hold signal instructs the vehicle to hold at a hold position;
based at least in part on receiving the hold signal, causing the vehicle to hold at the hold position;
receiving a release signal, wherein the release signal comprises an instruction to control the vehicle to the waypoint; and
controlling the vehicle to the waypoint.

10. The method of claim 8, wherein the waypoint comprises a first waypoint, the method further comprising:
receiving a second waypoint;
determining, as a validation, that at least one of the second waypoint complies with the safety protocol and that additional information indicates that a condition is met; and
based at least in part on determining the validation, control the vehicle based at least in part on the waypoint.

11. The method of claim 8, further comprising:
determining that the waypoint is associated with a terminating condition associated with an event;
receiving, from a remote guidance system, an instruction for the vehicle to autonomously control the vehicle after completing an operation associated with the waypoint;
determining, as a validation, that the waypoint complies with the safety protocol;
based at least in part on the validation, controlling the vehicle based at least in part on the waypoint; and
based at least in part on receiving the instruction, controlling the vehicle along a previous trajectory.

12. The method of claim 8, wherein transmitting the request is performed in response to at least one of:
an obstacle in a path of the vehicle;
a scenario outside a capability of the vehicle;
a scenario that violates an operations protocol of the vehicle;
a driveline beyond a line of sight of the vehicle;
a construction zone in the path of the vehicle; or
a sensor vision impairment of the vehicle based on a road condition.

13. The method of claim 8, wherein the vehicle is traversing a route and wherein transmitting the request is based at least in part on an obstacle along the route, the method further comprising:
receiving a second waypoint including a second orientation and a second position;
determining that the second waypoint is within a threshold distance of the route;
determining, based at least in part on the threshold distance, that the obstacle is behind the vehicle;
determining, based at least in part on the obstacle being behind the vehicle, that a terminating condition for receiving guidance is met; and
based at least in part on determining that the terminating condition is met, controlling the vehicle autonomously without additional external input.

14. The method of claim 8, wherein determining the violation further comprises:
receiving additional information associated with a connection with a remote guidance computing device, the additional information including a latency and a bandwidth of the connection; and
determining at least one of:
the latency being above a threshold latency, or
the bandwidth being below a threshold bandwidth.

15. One or more non-transitory computer-readable media storing instructions that, when executed, cause one or more processors to perform operations comprising:
- transmitting, from a vehicle, a request for guidance;
- receiving a waypoint including an orientation and a position;
- determining, based at least in part on the position and the orientation of the waypoint, a violation indicating that the waypoint violates a safety protocol; and
- based at least in part on determining the violation, refraining from controlling the vehicle based at least in part on the waypoint.

16. The one or more non-transitory computer-readable media of claim 15, the operations further comprising:
- receiving a hold signal, wherein the hold signal instructs the vehicle to hold at a hold position;
- based at least in part on receiving the hold signal, causing the vehicle to hold at the hold position;
- receiving a release signal, wherein the release signal comprises an instruction to control the vehicle to the waypoint; and
- controlling the vehicle to the waypoint.

17. The one or more non-transitory computer-readable media of claim 15, wherein the waypoint is a first waypoint, the operations further comprising:
- receiving a second waypoint associated with a second orientation and a second position;
- determining that the second waypoint complies with the safety protocol;
- based at least in part on determining the waypoint complies with the safety protocol, validating second the waypoint; and
- based on validating the second waypoint, controlling the vehicle based at least in part on the second waypoint.

18. The one or more non-transitory computer-readable media of claim 15, wherein the vehicle is traversing a route, the operations further comprising:
- determining an obstacle along the route;
- receiving a second waypoint including a second orientation and a second position;
- determining that the second waypoint is within a threshold distance of the route;
- determining, based at least in part on the threshold distance, that the obstacle is behind the vehicle;
- determining, based at least in part on the obstacle being behind the vehicle, that a terminating condition for receiving guidance is met; and
- based at least in part on determining that the terminating condition is met, controlling the vehicle autonomously and independently from the second waypoint.

19. The one or more non-transitory computer-readable media of claim 15, wherein determining the violation further comprises:
- receiving additional information associated with a connection with a remote guidance computing device, the additional information including a latency and a bandwidth of the connection; and
- determining at least one of:
  - the latency is above a threshold latency,
  - the bandwidth is below a threshold bandwidth,
  - a velocity of the vehicle is above a threshold velocity, or
  - a number of sensors available to provide sensor data is below a threshold number.

20. The one or more non-transitory computer-readable media of claim 15, wherein the position and the orientation included in the waypoint is provided, in response to the request, by an operator at a remote guidance computing device.

* * * * *